US008775127B2

(12) United States Patent
Gomez et al.

(10) Patent No.: US 8,775,127 B2
(45) Date of Patent: Jul. 8, 2014

(54) TRUSTWORTHINESS ASSESSMENT OF SENSOR DATA PROCESSING

(75) Inventors: Laurent Gomez, France (FR); Cédric Hébert, Mougins (FR); Alessandro Sorniotti, Antibes (FR); Cédric Ulmer, Nice (FR)

(73) Assignee: SAP AG, Walldorf (DE)

( * ) Notice: Subject to any disclaimer, the term of this patent is extended or adjusted under 35 U.S.C. 154(b) by 1091 days.

(21) Appl. No.: 12/394,175

(22) Filed: Feb. 27, 2009

(65) Prior Publication Data
US 2009/0222399 A1 Sep. 3, 2009

(30) Foreign Application Priority Data

Feb. 28, 2008 (EP) ..................................... 08290188

(51) Int. Cl.
*G06F 11/00* (2006.01)
(52) U.S. Cl.
USPC ......................................................... 702/188
(58) Field of Classification Search
CPC ................................. G08B 21/12; G05B 23/02
USPC .......... 702/108, 116, 127, 182, 186, 188, 189
See application file for complete search history.

(56) References Cited

U.S. PATENT DOCUMENTS

| 7,804,962 | B2 * | 9/2010 | Roy et al. ....................... 380/278 |
| 8,023,501 | B1 * | 9/2011 | Wang ............................. 370/386 |
| 8,116,243 | B2 * | 2/2012 | Zhiying et al. ................ 370/310 |
| 2003/0186663 | A1 | 10/2003 | Chen et al. |
| 2006/0195201 | A1 | 8/2006 | Nauck et al. |
| 2006/0224357 | A1 * | 10/2006 | Taware et al. ................. 702/179 |
| 2007/0005172 | A1 | 1/2007 | Malig et al. |
| 2008/0109536 | A1 * | 5/2008 | Hong et al. .................... 709/220 |
| 2009/0328148 | A1 * | 12/2009 | Lee et al. ........................... 726/3 |

OTHER PUBLICATIONS

European Search Report for EP Application No. 08290188, mailed Oct. 7, 2008, 5 pages.
Response to European Search Report for EP Application No. 08290188, filed on Oct. 14, 2008, 5 pages.

* cited by examiner

*Primary Examiner* — John Breene
*Assistant Examiner* — Yaritza H Perez Bermudez
(74) *Attorney, Agent, or Firm* — Brake Hughes Bellermann LLP

(57) ABSTRACT

The present description refers in particular to a computer-implemented method, computer program product, and computer system for trust evaluation of sensor data during at least part of a sensor data life-cycle. The computer-implemented method may include evaluating an acquisition trust value (ATV) of sensor data at a sensor data acquisition module from at least one sensor node in a wireless sensor network (WSN), wherein the WSN comprises at least one sink, evaluating a delivery trust value (DTV) of sensor data at a sensor data delivery module from a sending entity to a receiving entity; and evaluating a processing trust value (PTV) at a sensor data processing module in a processing entity, to obtain a trust evaluation of the sensor data.

28 Claims, 7 Drawing Sheets

| $combineb(b_e, b_f)$ | | $b_e$ | | |
|---|---|---|---|---|
| | | Low | Medium | High |
| $b_f$ | Low | Low | Medium | High |
| | Medium | Medium | Medium+ | High+ |
| | High | High | High+ | High++ |

TRUSTWORTHINESS ASSESSMENT OF SENSOR DATA PROCESSING

CROSS-REFERENCE TO RELATED APPLICATION

This application claims priority under 35 U.S.C. §119 to European Patent Application EP 08 29 0188, filed Feb. 28, 2008, titled "TRUSTWORTHINESS ASSESSMENT OF SENSOR DATA PROCESSING," which is incorporated herein by reference in its entirety.

TECHNICAL FIELD

The description is directed generally to wireless sensor networks (WSN) and in particular to a computer-implemented method, computer system, and computer program product for trust evaluation of sensor data in a sensor data life-cycle.

BACKGROUND

Wireless sensor networks (WSN) are sensor networks empowered with short wireless communication capabilities. WSNs enable random and dense deployment of smart and low-cost devices in physical areas such as battlefield and body. The ability of WSNs to monitor and control physical environments makes WSN attractive for a lot of different application domains such as military, health care or traffic control. However, the integration of WSN into (complex) computer or software applications (e.g. a software for a medical emergency response center or weather forecasting systems such as a gale or storm warning system) raises technical challenges such as data routing and processing (e.g. data aggregation and data fusion). In addition to those technical challenges, the integration of WSN into software applications raise technical challenges regarding security and trust issues. In particular, such software applications require secured and trusted sensor data processing as well as secured and trusted delivery of sensor data e.g. form a WSN to a software application. In order to prevent false aggregation or fusion of data or information, software applications may, for example, require trust mechanisms for establishing their confidence in the delivered sensor data from the WSN.

Due to vulnerability of a WSN (or single sensor nodes in a WSN), attackers may easily capture a sensor node. An attacker may, for example, tend to make a WSN interoperable. Although cryptographic mechanisms are deployed for ensuring confidentiality and integrity of sensor data, those approach do not cope with compromised sensor nodes wherein cryptographic material of the sensor node is disclosed to an attacker.

SUMMARY

In one general aspect, a computer-implemented method for trust evaluation of (physical or electronic) sensor data during at least part of a sensor data life-cycle may include evaluating an acquisition trust value (ATV) of sensor data at a sensor data acquisition module from at least one sensor node in a wireless sensor network (WSN), wherein the WSN comprises at least one sink, evaluating a delivery trust value (DTV) of sensor data at a sensor data delivery module from a sending entity to a receiving entity; and evaluating a processing trust value (PTV) at a sensor data processing module in a processing entity, to obtain a trust evaluation of the sensor data (or in order to obtain a sensor data trustworthiness evaluation).

According to another aspect, evaluating a processing trust value (PTV) may include evaluating an aggregation trust value (AgTV) and evaluating a fusion trust value (FTV) in the processing entity. According to yet another aspect, the processing entity may either involve the at least one sensor node or a middleware. According to yet another aspect, the sending entity may involve (particularly be) the at least one sensor node and the receiving entity may involve the at least one sink or the sending entity may involve the at least one sink and the receiving entity may involve a middleware or the sending entity may involve the middleware and the receiving entity may involve at least one software application.

According to yet another aspect, evaluating an acquisition trust value (ATV) may further include determining at least one trust value $\phi$ ($P_{a_i}$,e) of at least one sensor data attribute of the sensor data acquired from the at least one sensor node, and evaluating the acquisition trust value (ATV) of the sensor data by means of an operator $\phi_{acqu}$ depending on said at least one trust value $\phi$ ($P_{a_i}$,e) and at least one corresponding weighting value $\alpha_i$. Thus, trustworthiness of sensor data acquired from a sensor node may be based on the trustworthiness of their sensor data attributes, wherein also an impact of sensor data attribute confidence or trust may be captured. To that effect, the notion of weight defined for each of the sensor data attributes may be considered when evaluating or computing an ATV. A weighting value may include, for example, a real number between 0 and 1, wherein a proposition (e.g. of a sensor data attribute) may have a higher weight the higher its corresponding weighting value is. Considering a weighting value for each of the sensor data attributes, it enables, for example, to leverage impact or influence of an origin or accuracy of the sensor data on the ATV.

According to yet another aspect, evaluating a delivery trust value (DTV) may further include determining a trust value $\phi$ ($P_s$,f) of the sending entity in the sensor data, determining a trust value $\phi$ ($P_f$,e) of the receiving entity in the sending entity, and evaluating the delivery trust value (DTV) using an operator $\phi_{del}$ depending on said trust values $\phi$ ($P_s$,f) and $\phi$ ($P_f$,e). Sensor data may be transferred or routed, for example, from sensor node to sink, from sink to middleware, and from middleware to software application, i.e. among entities related to a sensor data life-cycle. Each entity may have a confidence or trust in another entity delivering sensor data to said entity, denoted $\phi$ ($P_f$,e). Furthermore, the entity delivering the sensor data itself may have a confidence in the sensor data to be delivered, denoted $\phi$ ($P_s$,f). Trustworthiness of the delivered sensor data from the sending entity to the receiving entity may then be expressed or specified by the corresponding DTV which may be computed based on said two trust values.

According to yet another aspect, evaluation of an aggregation trust value (AgTV) may further include determining at least one trust value $\phi$ ($P_{s_i}$,e) of at least one piece of sensor data, and evaluating the aggregation trust value (AgTV) for sensor data aggregated from the at least one piece of sensor data by means of an operator $\phi_\oplus$ depending on said at least one trust value $\phi$ ($P_{s_i}$,e) and at least one corresponding weighting value $\alpha_i$. Aggregation of sensor data may include, for example, a collection of (pieces of) sensor data which is neither modified nor inferred when compared to the (pieces of) sensor data comprised in the aggregation. When evaluating or computing an AgTV, an influence or impact of each piece of sensor data in trustworthiness of the corresponding aggregated sensor data may be captured or considered. Furthermore, the aggregated sensor data may be weighted in the AgTV.

According to yet another aspect, evaluation a fusion trust value (FTV) may further include determining at least one trust value $\phi$ ($P_{s_i}$,e) of at least one piece of sensor data, and evaluating the fusion trust value (FTV) for sensor data fused from the at least one piece of sensor data using an operator $\varphi_\otimes$ depending on said at least one trust value $\phi$ ($P_{s_i}$,e) and at least one corresponding weighting value $\alpha_i$. In comparison with sensor data aggregation, for example, sensor data fusion may include modification and/or inference of pieces of sensor data included in the fused sensor data. When evaluating or computing a FTV, an influence or impact of each piece of sensor data in trustworthiness of the corresponding fused sensor data may be captured or considered. Furthermore, the fused sensor data may be weighted in the FTV, i.e. each piece of sensor data included in evaluation of the fusion trustworthiness may be weighted (or has a corresponding weighting value).

According to yet another aspect, the method may further include determining the at least one trust value $\phi$ ($P_{a_i}$,e) by computing at least one opinion value $\omega_{a_i}^e$ on the at least one sensor data attribute, and implementing the operator $\phi_{acqu}$ using a combine operator combining the at least one opinion value $\omega_{a_i}^e$ according to the at least one corresponding weighting value $\alpha_i$.

According to yet another aspect, the method may further include determining the trust value $\phi$ ($P_s$,f) by computing an opinion value $\omega_s^f$; determining the trust value $\phi$ ($P_f$,e) by computing an opinion value $\omega_f^e$, and implementing the operator $\phi_{del}$ using a discount operator applied to the opinion values $\omega_s^f$ and $\omega_f^e$.

According to yet another aspect, the method may further include determining the at least one trust value $\phi$ ($P_{s_i}$,e) by computing at least one opinion value $\omega_{s_i}^e$ on the at least one piece of sensor data, and implementing the operator $\phi_\oplus$ using an average operator computing an average of the at least one opinion value $\omega_{s_i}^e$ according to the at least one corresponding weighting value $\alpha_i$.

According to yet another aspect, the method may further include determining at least one trust value $\phi$ ($P_{s_i}$,e) by computing at least one opinion value $\omega_{s_i}^e$ on the at least one piece of sensor data, and implementing the operator $\varphi_\otimes$ using the combine operator combining the at least one opinion value $\omega_{s_i}^e$ according to the at least one corresponding weighting value $\alpha_i$. In other words, for example, the trust model may be implemented by mapping trust (or trustworthiness) assessment (or evaluation) to a subjective logic opinion. An opinion may be expressed by a 4-tuple (b, d, u, a), i.e. belief, disbelief, uncertainty, and atomicity. An opinion may be determined for a proposition (i.e. any event occurring in a sensor data life-cycle). Opinions may be used to assess (or evaluate) trustworthiness of sensor data using subjective logic comprising the notion of opinions, trust values (i.e. ATV, DTV, AgTV, and FTV) can be computed while taking into account belief and uncertainty an entity has in sensor data. Opinions on sensor data can be subsumed or interrelated using different operators on opinions. For example, the subject-logic operator discount may be re-used during sensor data delivery, i.e. when assessing a DTV of a receiving entity in the received sensor data. Furthermore, the subjective logic operator average is modified or adapted in order to consider (or additionally handle) weighting values on corresponding pieces of sensor data when aggregating said pieces of sensor data during sensor data aggregation in order to compute an AgTV. Beyond, in order to determine an opinion of a single entity about different interdependent sensor data attributes or pieces of sensor data during sensor data acquisition and sensor data fusion, respectively (i.e. when computing an ATV and a FTV, respectively), a new operator on subjective logic opinions, combine, may be implemented, e.g., as described herein.

According to yet another aspect, implementing the combine operator may further include implementing a combineb operator to compute belief by combining at least one belief value $b_i$ of the at least one sensor data attribute or of the at least one piece of sensor data according to the at least one corresponding weighting value, and implementing a combineu operator to compute uncertainty by combining at least one uncertainty value $u_i$ of the at least one sensor data attribute or of the at least one piece of sensor data according to the at least one corresponding weighting value $\alpha_i$, wherein an influence of the uncertainty is minimized in comparison with the belief.

In another general aspect, a computer program product may include computer readable instructions, which when loaded and run in a computer and/or computer network system, cause the computer system and/or the computer network system to evaluate an acquisition trust value (ATV) of sensor data at a sensor data acquisition module from at least one sensor node in a wireless sensor network (WSN), wherein the WSN comprises at least one sink, evaluate a delivery trust value (DTV) of sensor data at a sensor data delivery module from a sending entity to a receiving entity, and evaluate a processing trust value (PTV) at a sensor data processing module in a processing entity, to obtain a trust evaluation of the sensor data.

In another general aspect, a computer system for trust evaluation of sensor data during at least part of a sensor data life-cycle, the system including computer-readable instructions stored on a computer readable-medium, may include a sensor data acquisition tool operable to evaluate an acquisition trust value (ATV) of sensor data at sensor data acquisition from at least one sensor node in a wireless sensor network (WSN), wherein the WSN comprises at least one sink, a sensor data delivery tool operable to evaluate a delivery trust value (DTV) of sensor data at sensor data delivery from a sending entity to a receiving entity, and a sensor data processing tool operable to evaluate a processing trust value (PTV) at sensor data processing in a processing entity, to obtain a trust evaluation of the sensor data.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

DETAILED DESCRIPTION

Figure 1:
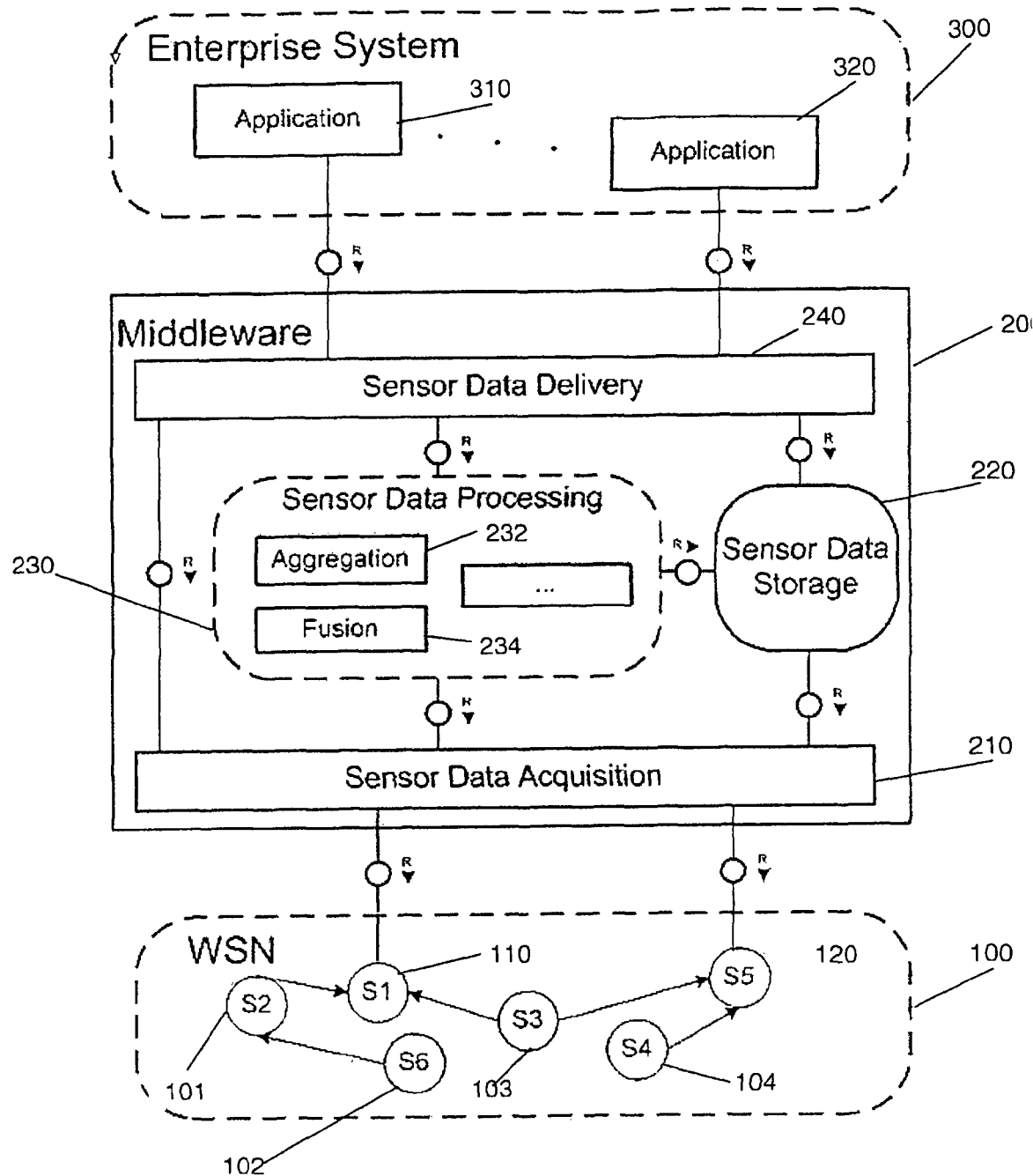
FIG. 1 is a block diagram of an exemplary life-cycle of sensor data processed and routed between a WSN, a middleware and software applications.

As described herein, trust or trustworthiness in physical sensor data may be evaluated or assessed in or at each processing step of a sensor data life-cycle in a sensor data processing system. A sensor data life-cycle may include acquiring sensor data from one or more sensor nodes in a WSN, processing (comprising aggregation and fusion) and routing the sensor data within the WSN towards at least one sink of the WSN and from there to a middleware. The middleware may then perform processing (e.g., aggregation and fusion) on the sensor data not generally supported by the one or more sensor nodes, and may then deliver the sensor data to at least one software application. Hence, a sensor data life-cycle may include sensor data acquisition, sensor data delivery, and sensor data processing including sensor data aggregation and sensor data fusion. An entity in such a sensor data life-cycle performing one or more of said (sensor data) operating or processing steps may include one or more of a sensor node of a WSN, a sink of a WSN, a middleware, or a software application. The middleware may be in charge of integrating the WSN into a software application.

Trust or trustworthiness in such a sensor data life-cycle may be then evaluated (assessed, determined or computed) by computing corresponding trust values in each of the processing steps of the sensor data life-cycle. The corresponding trust value (i.e. ATV, DTV, PTV) may then express or specify an expectation probability of a corresponding entity that the sensor data is true (and thus trustworthy enough to be used). A trust value may be a real number between 0 and 1 excluding 0 and 1 themselves, wherein a trust value closer to 0 is less true (i.e. the sensor data is rather not trustworthy) than a value closer to 1 (i.e. the sensor data is rather trustworthy). For example, during sensor data acquisition, a sensor node acquiring sensor data has a ATV in said sensor data. Similarly, during sensor data processing, the sensor node or a middleware processing the sensor data has a PTV in said sensor data. During sensor data delivery, a receiving entity has a DTV in said sensor data received from a sending entity.

In a computer system, as described in more detail herein, a trust value may be expressed or specified in terms of a fuzzy logic value assigned to a proposition. In one example, a proposition may be any event occurring in a sensor data life-cycle such as sensor data "pulse of 90" acquired from a sensor node. Furthermore, for trust evaluation of sensor data in a sensor data life-cycle, each trust value on a proposition may be computed according to an entity, which has the computed trust value in said proposition. In other words, trust of sensor data from acquisition from sensor nodes in a WSN to delivery to software applications including aggregation and fusion may be specified. Hence, a trust model may be determined for sensor data processing in a sensor data life-cycle by computing appropriate trust values each of the participating entities has in the sensor data at or during a specific processing step of the life-cycle. Thus, in addition to supporting trust evaluation of data directly acquired from sensor nodes, the present description is directed to trustworthiness assessment or trust evaluation of sensor data processing during their complete life-cycle.

In the following, a detailed description of examples will be given with reference to the drawings. It should be understood that various modifications to the examples may be made. In particular, elements of one example may be combined and used in other examples to form new examples.

The following description(s) relate to establishment of trust in sensor data retrieved from sensor nodes in a wireless sensor network, having an increased amount of homogeneity in the evaluation process of sensor data relative to existing systems. In particular, the described implementations are capable of considering the complete sensor data life-cycle. By extending trustworthiness evaluation beyond sensor data acquired from sensor nodes, software applications are able to access their confidence or trust in further data processing. Furthermore, the described approaches are capable of considering features beyond an origin or value of sensor data in their trustworthiness evaluation process(es).

As referenced herein, a wireless sensor network (WSN) may be understood to include, for example, virtually any (possibly self-organized) wireless network typically involving low-cost and low-power sensor devices which are capable of physically and/or chemically sensing, processing, routing and disseminating data toward special sensor nodes, so-called sinks, in a very efficient way, by saving sensor node battery or WSN bandwidth. A sensor data device may include, for example, a pulse sensor, a blood pressure sensor and further physiological (e.g. received from body tissue or fluids such as blood, blood products, urine, and/or bile), psychological, and/or behavioral data sensors, a room temperature sensor, or sensors for retrieving weather data. A sink (collecting or transmitting sensor node) is a specific sensor node in a WSN which may be capable of receiving and/or collecting sensor data acquired from other sensor nodes in the WSN and of transmitting collected sensor data, e.g. in packed form, to other software components. In this context, various kinds of failure (e.g., crash, omission, timing, value or arbitrary) in a WSN may occur. Crash or omission may imply no response from the sensor to a sensor data request. Timing may refer to time-out during request processing. Value failure may deal with delivering incorrect or compromised sensor nodes. Arbitrary failure may comprise one or more further kinds of failure which may not be classified in one of the previously described categories or classes of failure.

A sensor data life-cycle in a sensor data routing and processing system may refer to the complete process from the acquisition of data and/or information from a (sensor) node in a WSN, to its delivery to software applications through a middleware, including data processing such as (data) aggregation and/or (data) fusion at sensor nodes and/or the middleware.

Trustworthiness of computer systems and/or software applications in data, system entities, and/or data processing, as these and similar terms may be used herein, may be described as the expectation of cooperative behavior of a computer-implemented entity such as a sensor node, a software component, or a web service. Trust may encompass objective and subjective aspects on such an entity including, e.g., reputation. In other words, trust may be defined as the belief of a computer entity (e.g. sensor node, sink, middleware, applications) in the observation of a given event (occurring in a computer system or software application such as data acquired from a sensor node). Trust may be then evaluated or computed (by a computer program) as the probability expectation that a given event would occur or is true. Such a probability expectation may be expressed as a real number between 0 and 1, wherein a value closer to 0 is less probable to be true (hence, less trustworthy) than a value closer to 1.

FIG. 1 shows an exemplary life-cycle of sensor data in a sensor data routing and processing system. A life-cycle of sensor data or a sensor data life-cycle is established from a wireless sensor network (WSN) 100 over a middleware 200 to a (complex software) system 300.

The WSN 100 comprises one or more sensor nodes 101, 102, 103, 104, 110, 120 representing electric, electronic or digital sensor devices, wherein at least one of the sensor nodes 101, 102, 103, 104, 110, 120 is a sink 110, 120. Sensor devices may be any kind of electric, electronic or digital sensor such as physical, chemical, biological sensors for retrieving physiological (e.g. received from body tissue or fluids such as blood, blood products, urine, and/or bile), psychological, and/or behavioral data such as blood pressure, body temperature, pulse, blood sugar level, etc. from human beings or sensors for measuring environmental or weather data, and others.

The sink (receiving or collecting sensor node) 110, 120 is a special sensor node which is (beyond measuring of sensor data) capable of receiving sensor data from one or more sensor nodes 101, 102, 103, 104 in the WSN 100 and to transport the received sensor data to a further application such as the middleware 200 using appropriate transport protocols. In other words, a sink 110, 120 supports routing and transport or delivery of sensor data acquired from one or more sensor nodes 101, 102, 103, 104 within a WSN 100 and to a further application such as a middleware 200.

In the present context, sensor data may include or refer to a composition of a type or sensor type (e.g. ambient, temperature, pulse) and a finite list of attributes or sensor data attributes. An attribute may be any information which characterizes sensor data or a piece of sensor data. Formally, as described in more detail with respect to FIG. 2, a sensor data attribute may be defined as a pair of an attribute (data) type and its value and (a piece of) sensor data may be then defined as a pair of a sensor data type and a finite list of sensor data attributes, wherein for each attribute type there exists at most one sensor data attribute.

Sensor data acquisition may comprise acquisition of (analog/digital) signals and/or waveforms received at a sensor device and processing the received signals to obtain desired information and/or data. As may be appreciated from the above, the received signals may be based on or relate to measurements of physical phenomenon or physical property of an object such as the temperature change of a room, the intensity or intensity change of a light source or various physiological parameters of a human being such as heart rate and blood pressure. On or more transducers may be used to convert the physical property or phenomenon into corresponding measurable electrical signals such as voltage. Hence, during data acquisition, appropriate sensors may convert any measurement parameter to an electrical and/or optical signal, which may be acquired by data acquisition hardware. Acquired data may be displayed, analyzed, and stored on a computer or computer system.

The middleware 200 enables or allows for a seamless integration of the WSN 100 into software application 310, 320 in order to assess a sensor data life-cycle. In one implementation, the middleware 200 is a common or standard middleware for WSN. The middleware 200 hides complexity of data-routing or heterogeneity of sensor networks to software applications, in favor of a simplified interface to preprocessed and standardized sensor data.

Middleware in this context may refer to a particular software component that may aim at providing a seamless integration of WSN into software applications. The middleware may hide complexity of data routing or heterogeneity of sensor networks to software applications, in favor of a simplified interface to preprocessed and standardized sensor data. Middleware may be distinguished among middleware for WSN and middleware for distributed context-aware systems.

The software applications 310, 320 may include (complex) front-end systems which are capable of further processing and/or representing sensor data received from the one ore more sensor nodes 101, 102, 103, 104, 110, 120 in the sensor data system establishing a sensor data life-cycle as shown in FIG. 1. Examples of such software applications 310, 320 are a medical emergency response center, weather forecasting systems such as a gale or storm warning system, or a traffic management system.

In a life-cycle of sensor data as exemplarily shown in FIG. 1, sensor data is acquired 210 from one or more sensor nodes 101, 102, 103, 104. Sensor data is then routed and processed within a WSN 100 towards at least one sink 110, 120 in the WSN 100 and further to a middleware 200. The middleware 200 is in charge of performing data processing unsupported by the sensor nodes 101, 102, 103, 104 in a sensor data processing system 230. Sensor data processing 230 comprises sensor data aggregation 232 and sensor data fusion 234.

Sensor data aggregation 232 may include or refer to gathering information and/or data from different sources such as sensor nodes, middleware, and/or data fusion. Within a WSN, sensor data aggregation may support reduction of resource consumption. At middleware level, (sensor data) aggregation may provide software applications with a single collection of sensor data of interest for the software applications. In other words, sensor data aggregation may be an automated collection of sensor data without any modification or inference on the data.

Sensor data fusion 234 may relate to an automated computing process of combining data or information to estimate or predict one or more entity states. Sensor data fusion may be substantially equivalent to any reasoning or statistical analysis about sensor data which may result in a more abstract or complex contextual information. Sensor data fusion may imply a relationship (e.g. inference, rule, similarity) between information and/or data involved in the fusion. In other words, sensor data fusion may comprise automatic (or automated) reasoning on a set of sensor data based on computer-implemented inference rules resulting in a single sensor data.

Optionally, the middleware 200 may store received (and possibly processed) sensor data in a sensor data storage device 220 such as a database. Using a sensor data delivery system 240, the middleware 200 delivers (transports, transmits, or transfers) the sensor data to one or more software applications 310, 320 possibly through a standardized or common interface.

In other words, a sensor data life-cycle in a sensor data processing system as shown in FIG. 1 comprises sensor data acquisition 210 at sensor nodes 101, 102, 103, 104, sensor data processing at sensor nodes of the acquired sensor data, routing (transport, delivery or transfer) of the (acquired and at least partly processed) sensor data to at least one sink 110, 120 in a WSN 100, delivery (transport or transfer) of the sensor data to a middleware 200 for sensor data processing 230 comprising sensor data aggregation 232 and sensor data fusion 234, and, finally, delivery (transport or transfer) of the sensor data 240 to at least one software application 310, 320. Hence, a sensor data life-cycle may include sensor data acquisition 210, sensor data processing 230 including aggregation 232 and fusion 234, and sensor data delivery 240. Those steps of a life-cycle of sensor data are detailed described in the following.

Figures 2, 3A:
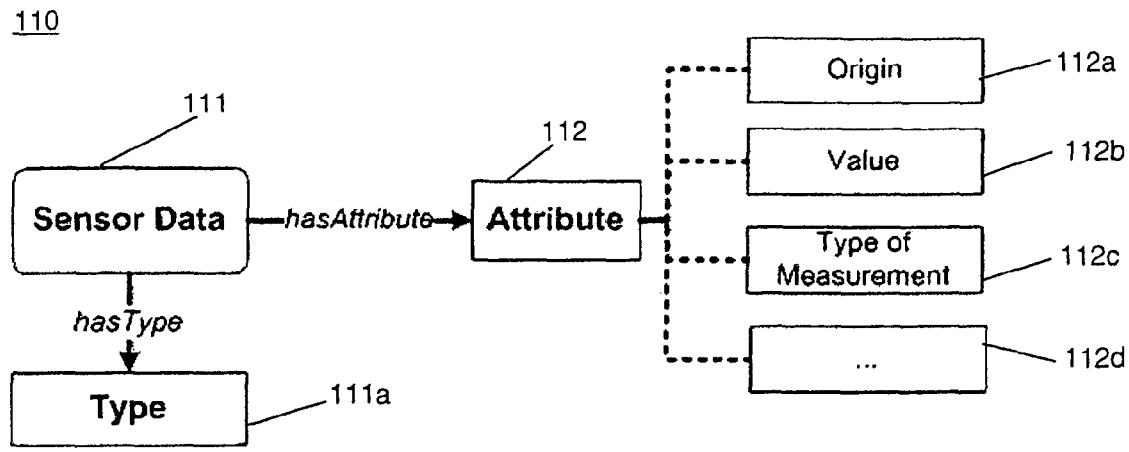
FIG. 2 is a block diagram of exemplary sensor data.
FIG. 3A shows a table of an exemplary evolution of a combineb operator when combining two beliefs $b_e$ and $b_f$ on sensor data.

FIG. 2 shows an example of sensor data 111 acquired from a sensor node 110 of a WSN 100. The sensor data 111 has a type 111a such as ambient, temperature, or pulse corresponding to the sensor node 110 (e.g. an ambient sensor, a temperature sensor, or a pulse sensor, respectively) from which the sensor data 111 is acquired or retrieved. Hence, the sensor data type 111a may correspond to the kind of sensor device (e.g. a blood pressure sensor or a pulse sensor) from which the sensor data is acquired or retrieved. Furthermore, the sensor data 111 has one or more sensor data attributes 112 such as accuracy, origin, value, metric, or type of measurement. A sensor data attribute 112 can be any information and/or data characterizing or describing the sensor data 111. A sensor data attribute 112 is formally defined as below in definition 1.

Definition 1. (Sensor Data Attribute)

Let a sensor data attribute be a pair a=<t,v> where t is the attribute type and v its value.

Accordingly, a sensor data attribute 112 comprises a (sensor data attribute) type 112a, 112b, 112c, 112d such as accuracy, origin, value, metric, or type of measurement describing or characterizing data which could be retrieved from a corresponding sensor node 110. For example, a sensor data type body-temperature 111a (i.e. specifying a body temperature sensor) may comprise a sensor data attribute 112 of attribute type value 112b having the value 37.5.

Based on definition 1 of sensor data attributes 112, (a piece of) sensor data 111 acquired from a sensor node 110 in a WSN 100 is formally defined below in definition 2:

Definition 2. (Sensor Data)

Let a piece of sensor data s be a pair $<s_{type}, <a_i>_{i=0}^n>$ where $s_{type}$ is the sensor data type and $<a_i>_{i=0}^n$ is the list of its n attributes such that for each i=1, . . . , n there exists only (exactly) one sensor data attribute $a_i$ of attribute type $t_i$.

Accordingly, sensor data 111 or a piece of sensor data 111 received or acquired from a sensor node 110 (e.g. a sensor device such as a body temperature sensor) has a sensor (data) type 111a such as body temperature and a finite list of sensor data attributes 112, wherein each of the sensor data attributes 112 has a different sensor (data) attribute type 112a, 112b, 112c, 112d.

An example of sensor data 111 acquired from a sensor node 110 (e.g. a temperature sensor device) having sensor type bodytemperature and a list of sensor data attributes 112 each having a different attribute type 112a, 112b, 112c, 112d is shown below.

```
s = < bodytemperature,
    < <value, "37.5">,
      <metric, "celsius">,
      <typeofmeasurement, "behind ears">,
      <origin, "sensor1234">,
      <accuracy, "+-0.5">
    >
```

Accordingly, sensor data s acquired from a sensor node 110 has sensor type 111 bodytemperature and a finite list of sensor data attributes 112, each having a different sensor data attribute type 112a, 112b, 112c, 112d: value, metric, typeofmeasurement, origin, accuracy and a corresponding value: "37.5", "celsius", "behind ears", "sensor1234", "±0.5", respectively.

Different modeling and/or programming languages can be used to represent or specify sensor data 111 acquired from a sensor node 110 comprising a sensor type 111a and one or more sensor data attributes 112 in a computer or machine readable and processable format such as XML.

During a life-cycle of sensor data 111, the sensor data 111 is acquired from one or more sensor nodes 101, 102, 103, 104, 110, 120 of a WSN 100. The acquired data is routed or forwarded from the sensor nodes 101, 102, 103, 104 to at least one sink 110, 120, from there delivered (or transmitted) to a middleware 200, and finally delivered to one or more software applications 310, 320.

The process of delivery of sensor data s from an entity e to an entity f is noted as $s|^{e \to f}$.

Accordingly, sensor data 111 is delivered from a first entity to a second entity. The first entity may be a sensor node 101, 102, 103, 104 within a WSN 100 and the second entity a sink 110, 120 of the WSN 100. Alternatively, the first entity may be a sink 110, 120 and the second entity a middleware 200. Finally, the first entity may be a middleware 200 and the second entity a software application 310, 320. Hence, sensor data 111 is delivered between each of the system entities or components (WSN 100, middleware 200, software applications 310, 320) of a sensor data processing system during the sensor data's 111 life cycle as shown in FIG. 1.

Sensor data processing or processing of sensor data 230 both at one or more sensor nodes 101, 102, 103, 104 of a WSN 100 and/or at a middleware 200 comprises sensor data fusion 234 and sensor data aggregation 232.

Sensor data fusion 234, as referenced above, may be a process of combining data or information to estimate or predict entity states such as states of a sensor node 101, 102, 103, 104, 110, 120 or a middleware 200. Sensor data fusion 232 comprises automatic (or automated) reasoning and/or statistical analysis (e.g. using inference rules and/or statistical analysis functions) about sensor data 111 which results in more abstract contextual information.

For example, fusion of sensor data 111 relating to a body temperature, a pulse, and a blood pressure acquired from corresponding one or more sensor nodes 101, 102, 103, 104, 110, 120 may result in contextual information such as a patient's health condition. Hence, sensor data fusion 234 implies a relationship between information and/or data involved in the fusion. For example, sensor data fusion of physiological data acquired from corresponding sensor devices for a patient is fused in order to determine an overall health status or health condition of the patient based on relationships among the acquired physiological data.

In one implementation, such a relationship is implemented in a computer system by automated inference rules and/or similarity. Sensor data fusion 234 involves automatic reasoning on a set or collection of sensor data 111 based on computer-implemented inference rules. The result or outcome of such automatic inferences on the sensor data 111 may be a single sensor data. At WSN 100 level, sensor data fusion using such inference rules for automatic reasoning enables to transmit a single sensor data 111 to a sink 110, 120 and/or a middleware 200 instead of a possibly large set of a collection of sensor data. At middleware 200 level, sensor data fusion 234 aims at delivering high level contextual information and/ or data from a WSN 100 to a software application 310, 320. The high level contextual information may be inferred or computed depending on requirements of the receiving software application 310, 320. For example, a health care monitoring system with an appropriate software application 310, 320 for a rehabilitation center for heart disease patients requires complex contextual information which may be automatically inferred from different sensor data relating to a patient's heart rate and blood pressure through sensor data fusion.

Sensor data fusion either at WSN level 100 or at middleware level 200 is formally defined in definition 3 below:

Definition 3. (Sensor Data Fusion)

Let $\otimes$ be a fusion function such that $\otimes : (<s_i>)_{i=0}^n = s_{fused}$.

Accordingly, sensor data fusion is defined by a specific function, denoted $\otimes$, over a collection or a set of sensor data 111 acquired or collected from one or more sensor nodes 101, 102, 103, 104, 110, 120 which resulted in a single fused sensor data. The function $\otimes$ may be any specific function corresponding to requirements of a particular WSN 100 and/or the requirements of a specific software application 310, 320 receiving the fused data which may be implemented as a computer program by a set of automatic inference rules using any known programming language (e.g. Prolog, CHR, Java, Haskell).

An example of sensor data fusion 234 of sensor data types 111a bodytemperature and pulse acquired from corresponding sensor nodes 101, 102 results in a sensor type 111a healthcondition having a sensor data attribute 112 value having the value "critical":

$\otimes$
(<bodytemperature, <value, "41">>,
<pulse, <value, "180">>) =
<healthcondition, <value, "critical">>

Sensor Data Aggregation 232 either at WSN level 100 or at middleware level 200 may include, as referenced above, gathering information and/or data from different sources including sensor nodes 101, 102, 103, 104, 110, 120, a middleware 200, and/or sensor data fusion 234. At sensor nodes 101, 102, 103, 104, 110, 120 within a WSN, sensor data aggregation aims at reduction of resource consumption. Within a middleware 200, sensor data aggregation 200 provides one or more software applications 310, 320 with a single collection or set of sensor data 111 which may be of interest for the specific software application 310, 320.

Contrary to sensor data fusion 234, sensor data aggregation 232 does not imply any kind of relationship among aggregated sensor data. Sensor data aggregation 232 is formally defined as follows:

Definition 4. (Sensor Data Aggregation)

Let $\oplus$ be an aggregation function such as $\oplus: (<s_i>)_{i=0}^n \to <s_j>_{j=0}^m$.

Accordingly, sensor data aggregation 234 is defined by a specific function, denoted $\oplus$, over a collection or a set of sensor data 111 acquired or collected from one or more sensor nodes 101, 102, 103, 104, 110, 120 which resulted in a single aggregated sensor data. The function $\oplus$ may be any specific function corresponding to requirements of a particular WSN 100 and requirements of a specific software application 310, 320 receiving the aggregated data. Sensor data aggregation may be implemented as a computer program by a specific aggregation function using any known programming language (e.g. Prolog, CHR, Java, Haskell).

For example, sensor data aggregation of two different sensor data attributes 112 of sensor data type 111a bodytemperature and a sensor data attribute 112 of sensor data type 111a ambienttemperature is implemented by the aggregation function $\oplus$ as follows:

$\oplus$
(<bodytemperature, <value, "38">>,
<bodytemperature, <value, "37">>,
<ambienttemperature, <value, "21">>) =
<
<bodytemperature, <value, "37">>,
<ambienttemperature, <value, "21">>
>

In order to support a trustworthy sensor data acquisition, sensor data delivery, sensor data aggregation, and sensor data fusion of sensor data 111 in a sensor data life-cycle as shown in FIG. 1, a trust model for sensor data is implemented. The trust model is implemented for each of the above introduced sensor data processing steps in each of the layers of a sensor data life-cycle, i.e. the WSN 100, the middleware 200, and the software applications 310, 320 in the observation of a given event. Such an event may be sensor data acquired from a sensor node 101, 102, 103, 104, sensor data delivered from a first entity 101-104, 110, 120, 200, 310, 320 to a second entity 110, 120, 200, 310, 320, or sensor data processing.

The trust model may be implemented by a finite set of inference rules for a logic which is able to deal with beliefs and uncertainty expressed in terms of probabilities.

Trust, as referenced above, may be specified or defined as the belief of an entity (e.g. a sensor node 101, 102, 103, 104, a sink 110, 120, a middleware 200, a software application 310, 320) in an observation of a given event. Such an event may be that a sensor node has measure a patient's body temperature of 38° C. or a pulse of 90. Trust is then evaluated or computed as the probability expectation that a given event would occur, i.e. that a given even is expected to be true or is probably true. Such a probability expectation may be expressed by a real number between 0 and 1 wherein a value closer to 1 is more trustworthy than a value closer to 0.

In one implementation, an automated inference system based on implementing a probabilistic logic or a logic of beliefs is implemented in each of the sensor data processing steps (i.e. sensor data acquisition 210, sensor data delivery 240, sensor data aggregation 232, and sensor data fusion 234) among each of the layers (i.e. the WSN 100, the middleware 200, the software applications 310, 320) of a sensor data life-cycle.

The following events or propositions are introduced for trust evaluation in a sensor data life-cycle:

$P_s$="a given sensor data s is trustworthy enough to be used."
$P_a$="a given sensor data attribute a is trustworthy enough to be used."
$P_e$="a given entity e is trustworthy enough to use any sensor data coming from e."

Sensor data 111 and its corresponding sensor data attributes 112 is exemplarily shown in FIG. 2. An entity e may be a sensor node 101, 102, 103, 104, a sink 110, 120, a middleware 200, or a software application 310, 320 as shown in FIG. 1.

Trust evaluation of a proposition $P_x$, wherein x may be a sensor data s, a sensor data attribute a, or an entity e as defined above is formally defined below in definition 5:

Definition 5. (Trust Evaluation)

Let e be an entity. Trust evaluation $\phi(P_x, e)$ is e's expectation probability that $P_x$ is true where $\phi(P_x, e) \in [0,1]$.

A proposition $P_x$ may be an event, e.g. that a pulse sensor has measured a pulse of 90 or that a blood sugar sensor has measured a value of 97.

According to definition 5, trust evaluation at an entity e 101-104, 110, 120, 200, 310, 320 in a sensor data life cycle according to FIG. 1 is defined by an operator $\phi$ applied to a proposition $P_x$ and an entity e 101-104, 110, 120, 200, 310, 320 which results in a logical or truth value expressed by a real number between 0 and 1 denoting a probability, wherein a value approximating 0 is less trustworthy than a value approximating 1. For example, trust of a sensor node s 101, 102, 103, 104 in sensor data $P_s$ 111 acquired at the sensor node s 101, 102, 103, 104 may be computed or evaluated by $\phi(P_s,s)$ and results in a trust value $\phi=0.431$. Such an expectation probability may be determined or evaluated by a specific implementation of the operator $\phi$, e.g. depending on the measured value itself (e.g. a body temperature of 27° C. might be less realistic than a body temperature of 38° C.) or a trustworthiness of the senor node 101, 102, 103, 104 from which the data is retrieved or acquired.

In the following, trust or trustworthiness evaluation of sensor data at the different processing steps 210, 220, 230, 240 of a sensor data life-cycle according to FIG. 1 is defined.

Trustworthiness of sensor data acquisition 210 from sensor nodes 101, 102, 103, 104 in a WSN 100 is evaluated or computed according to formal definition 6 given below.

Definition 6. (Trusted Sensor Data Acquisition)

$\phi(P_s,e)=\phi_{acqu}(\phi(P_{a_i},e),\alpha_i)$ where i=1, ..., n and $\alpha_i$ is the weight of the $\alpha_i$ attribute on $\phi(P_s,e)$. $\phi(P_s,e)$ is called trustworthiness evaluation of sensor data s.

Accordingly, trust evaluation during sensor data acquisition 210 is determined by evaluating an acquisition trust value (ATV) of sensor data s acquired from an entity e, e.g. a sensor node 101, 102, 103, 104, which is formally denoted $\phi(P_s,e)$. In other words, the operator $\phi$ is applied to the proposition $P_s$ (e.g. "pulse is 90" acquired from a sensor node 110) and the entity e (e.g. said sensor node 110) and evaluates e's expectation probability that $P_s$ is true.

The acquisition trust value (ATV) (or $\phi(P_s,e)$), i.e. trust or trustworthiness evaluation of sensor data s 111 acquired from one or more sensor nodes 101, 102, 103, 104 is determined or computed based on trust or trustworthiness in the sensor data's s 111 sensor data attributes $a_i$ 112. Furthermore, the impact of sensor data attributes $a_i$ 112 confidences or trustworthiness of the acquired sensor data s 111 is captured. To that effect, a notion of weight $\alpha_i$ is introduced for each of the sensor data attributes $a_i$ 112 of the sensor data s 111. In other words, each of the evaluated trust values $\phi$ ($P_{a_i},e$), or $\phi_i$ for short, on the corresponding sensor data attributes $a_i$ 112 is weighted by a corresponding weighting value $\alpha_i$. The weighting value $\alpha_i$ may be a predetermined value represented by a real number between 0 and 1 expressing how much impact or influence a single sensor data attribute $a_i$ 112 (or its corresponding trust value) should have on a trust value of the sensor data s 111 itself. For example, a value attribute of a body temperature acquired from a body temperature sensor node might have a greater or larger impact on the trust in the sensor data than a metric attribute.

The weighting values $\alpha_i$ for the corresponding trust values $\phi_i$ of the sensor data attributes $a_i$ 112 enable, for example, to leverage (influence, affect, effect, manipulate, or force) impact of the origin or accuracy on the acquisition trust value (ATV) $\phi(P_s,e)$.

In other words, a trust value $\phi_i$ (or $\phi_i(P_{a_i},e)$) is determined or computed for each of the sensor data attributes $a_i$ 112 of the sensor data s 111 acquired from one or more sensor nodes 110 in a WSN 100. The acquisition trust value (ATV) $\phi(P_s,e)$ is then evaluated by means of an operator $\phi_{acqu}$ applied to the trust values $\phi_i$ determined for each of the sensor data attributes $a_i$ 112 and corresponding weighting values $\alpha_i$.

For example, the following sensor data s 111 may be acquired from a sensor node 110:

```
s = <bodytemperature,
    <<value, "37.5">,
      <metric, "celsius">,
      <typeofmeasurement, "behind ears">,
      <origin, "sensor1234">,
      <accuracy, "+-0.5">
    >
```

The sensor node 110 may have a trust value $\phi_i=0.53$ in the value attribute, a trust value $\phi_i=0.95$ in the metric attribute, a trust value $\phi_i=0.83$ in the typeofmeasurment attribute, a trust value $\phi_i=0.89$ in the origin attribute, and a trust value $\phi_i=0.65$ in the accuracy attribute. Furthermore, the value attribute and the accuracy attribute have a weighting value of $\alpha=0.8$ whereas the metric, typeofmeasurement and origin attributes each have a weighting value $\alpha=0.5$. When computing an acquisition trust value ATV for the acquired $\phi(P_s,e)$ by applying the $\phi_{acqu}$ to the above given values according to definition 6, the impact of the value and accuracy trust values on the ATV is enlarged due to their higher weighting values.

Trustworthiness of sensor data delivery 240 from a first entity f to a second entity e between the different layers according to FIG. 1, e.g. from a sensor node 101, 102, 103, 104 to a sink 110, 120, from a sink 110, 120 to the middleware 200, or form the middleware 200 to a software application 310, 320, is evaluated or computed according to definition 7 as given below.

Definition 7. (Trusted Sensor Data Delivery)

$\phi(P_{s|f \to e},e)=\phi_{del}(\phi(P_s,f),\phi(P_f,e))$. $\phi(P_{s|f \to e},e)$ is called trustworthiness evaluation of $s|^{f \to e}$.

Trustworthiness of sensor data delivery 240 is evaluated when transmitting or transporting sensor data 111 from sensor node 101, 102, 103, 104 to sink 110, 120, from sink 110, 120 to middleware 200, and from middleware 200 to application 310, 320 as shown in FIG. 1. According to definition 7, trust or trustworthiness in delivered sensor data s 111 from entity f to entity e is evaluated based on two trust values $\phi(P_s,f)$ and $\phi(P_f,e)$. $\phi(P_s,f)$ denotes an expectation probability of the sending entity f in the truth (or trustworthiness) of the sensor data s 111. $\phi(P_f,e)$ denotes an expectation probability the receiving entity e has in the truth or trustworthiness of the delivering or sending entity f.

For example, a sensor node f 110 has a trust value $\phi(P_s,f)=0.758$ in sensor data s 111, e.g.

```
s = <bodytemperature,
    <<value, "37.5">,
      <metric, "celsius">,
      <typeofmeasurement, "behind ears">,
      <origin, "sensor1234">,
      <accuracy, "+-0.5">
    >
``` acquired from the sensor node f 110. Furthermore, a sink e 120 receiving the sensor data s 111 from the sensor node f 110 has a trust value $\phi(P_f,e)=0.83$ in the sensor node f 110. To compute a corresponding delivery trust value (DTV) $\phi(P_{s|f \to e}, e)$, the operator $\phi_{del}$ is applied to the above trust values.

In other words, a trust value $\phi(P_s,f)$ an entity f has in sensor data s 111 is evaluated, for example according to definition 6 given above. Furthermore, a trust value $\phi(P_f,P_e)$ a receiving entity e has in the delivering entity f is determined. Based on these two trust values, a delivery trust value (DTV) $\phi(P_{s_i}^{f \to e}, e)$ is evaluated or computed by means of an operator $\phi_{del}$ applied to the two trust values $\phi(P_s, f)$ and $\phi(P_f, P_e)$.

Trustworthiness of sensor data aggregation 232 either at a sensor node 101, 102, 103, 104 in a WSN 100 or at middleware level 200 is evaluated or computed according to the following formal definition:

Definition 8. (Trusted Sensor Data Aggregation)

$\phi(p_{\oplus(s_i)_{i=0}^n}, e) = \phi_\oplus(\phi(P_{s_i}, e), \alpha_i)_{i=0}^n$ where $i = 1, \ldots, n$ is the number of aggregated sensor data and $\alpha_i$ is the weight of $s_i$ sensor data in $\phi(p_{\oplus(s_i)_{i=0}^n}, e)$. $\phi(p_{\oplus(s_i)_{i=0}^n}, e)$ is called trustworthiness evaluation of sensor data aggregation $\oplus(s_i)_{i=0}^n$.

Accordingly, trust in aggregated sensor data s 111 is evaluated by determining an entity e's expectation probability that aggregated sensor data s 111 aggregated from one or more pieces of sensor data $s_i$ is true.

Aggregation of sensor data $s_i$ may include a collection or set of sensor data $s_i$ without any modification or inference of the sensor $s_i$ data being aggregated. When evaluating a trustworthiness in the aggregated sensor data s 111, the impact of each piece of sensor data $s_i$ is captured in the aggregation. Furthermore, each trust value in each piece of sensor data $s_i$ is weighted.

For example, a sensor node e 110 aggregating sensor data $s_1$ to $s_3$ corresponding to the below given pieces of sensor data, i.e. bodytemperature having value 38, bodytemperature having value 37, and ambient temperature having value 21, has the following trust values in this data: $\phi(P_{s_1}, e) = 0.71$, $\phi(P_{s_2}, e) = 0.83$, $\phi(P_{s_3}, e) = 0.64$ which are for example computed according to definition 6. Furthermore, $\phi(P_{s_1}, e)$ and $\phi(P_{s_2}, e)$ have a weighting value $\alpha = 0.7$ whereas $\phi(P_{s_3}, e)$ has a weighting value $\alpha = 0.8$. When aggregating the sensor data $s_1$ to $s_3$ as follows $\oplus$
( <bodytemperature, <value, "38">>,
  <bodytemperature, <value, "37">>,
  <ambienttemperature, <value, "21">> ) =
<
  <bodytemperature, <value, "37">>,
  <ambienttemperature, <value, "21">>
>

A corresponding aggregation trust value (AgTV) $\phi(p_{\oplus(s_i)_{i=0}^n}, e)$ is evaluated by applying the operator $\phi_\oplus$ to the above given trust values $\phi(P_{s_1}, e) = 0.71$, $\phi(P_{s_2}, e) = 0.83$, and $\phi(P_{s_3}, e) = 0.64$ and corresponding weighting values $\alpha = 0.7$ and $\alpha = 0.8$. Due to said weighting values the impact of the ambienttemperature on the AgTV is increased whereas the impact of the bodytemperature on the AgTV is decreased.

In other words, trust values $\phi(P_{s_i}, e)$ for each piece of sensor data $s_i$ comprised in the aggregation an entity e has in each of the pieces of sensor data $s_i$ is determined. Then, an aggregation trust value (AgTV) $\phi(p_{\oplus(s_i)_{i=0}^n}, e)$ is evaluated by means of an operator $\phi_\oplus$ based on said trust values $\phi(P_{s_i}, e)$ and corresponding weighting values $\alpha_i$.

Trustworthiness of sensor data fusion 234 either at a sensor node 101, 102, 103, 104 in a WSN 100 or at middleware level 200 is evaluated or computed according to the following formal definition:

Definition 9. (Trusted Sensor Data Fusion)

$\phi(p \otimes_{(s_i)_{i=0}^n}, e) = \phi_\otimes(\phi(P_{s_i}, e), \alpha_i)_{i=0}^n$ where $i = 1, \ldots, n$ is the number of fused sensor data and $\alpha_i$ is the weight of $s_i$ sensor data in $\phi(p \otimes_{(s_i)_{i=0}^n}, e)$. $\phi(p \otimes_{(s_i)_{i=0}^n}, e)$ is called trustworthiness evaluation of sensor data fusion $\otimes(s_i)_{i=0}^n$.

Accordingly, trust in fused sensor data s 111 is evaluated by determining an entity e's expectation probability that fused sensor data s 111 fused from one or more pieces of sensor data $s_i$ is true. When evaluating a trustworthiness in the fused sensor data s 111, the impact of each piece of sensor data $s_i$ in the fusion is captured. Furthermore, each trust value in each piece of sensor data $s_i$ is weighted.

For example, a sensor node e 110 fusing sensor data $s_1$ and $s_2$ corresponding to the below given pieces of sensor data, i.e. bodytemperature having value 41, pulse having value 180, has the following trust values in this data: $\phi(P_{s_1}, e) = 0.71$, $\phi(P_{s_2}, e) = 0.83$ which are for example computed according to definition 6. Furthermore, $\phi(P_{s_1}, e)$ and $\phi(P_{s_2}, e)$ are equally weighted. When fusing the sensor data $s_1$ and $s_2$ as follows $\otimes$
(<bodytemperature, <value, "41">>,
 <pulse, <value, "180">>) =
<healthcondition, <value, "critical">>

A corresponding fusion trust value (FTV) $\phi(p \otimes_{(s_i)_{i=0}^n}, e)$ is evaluated by applying the operator $\phi_\otimes$ to the above given trust values $\phi(P_{s_1}, e) = 0.71$ and $\phi(P_{s_2}, e) = 0.83$ and corresponding weighting values. Since both trust values are equally weighted, they have the same impact on the FTV.

In other words, trust values $\phi(P_{s_i}, e)$ for each piece of sensor data $s_i$ comprised in the fusion an entity e has in each of the pieces of sensor data $s_i$ is determined. Then, a fusion trust value (FTV) $\phi(p \otimes_{(s_i)_{i=0}^n}, e)$ is evaluated by means of an operator $\phi_\otimes$ based on said trust values $\phi(P_{s_i}, e)$ and corresponding weighting values $\alpha_i$.

Figure 3C:
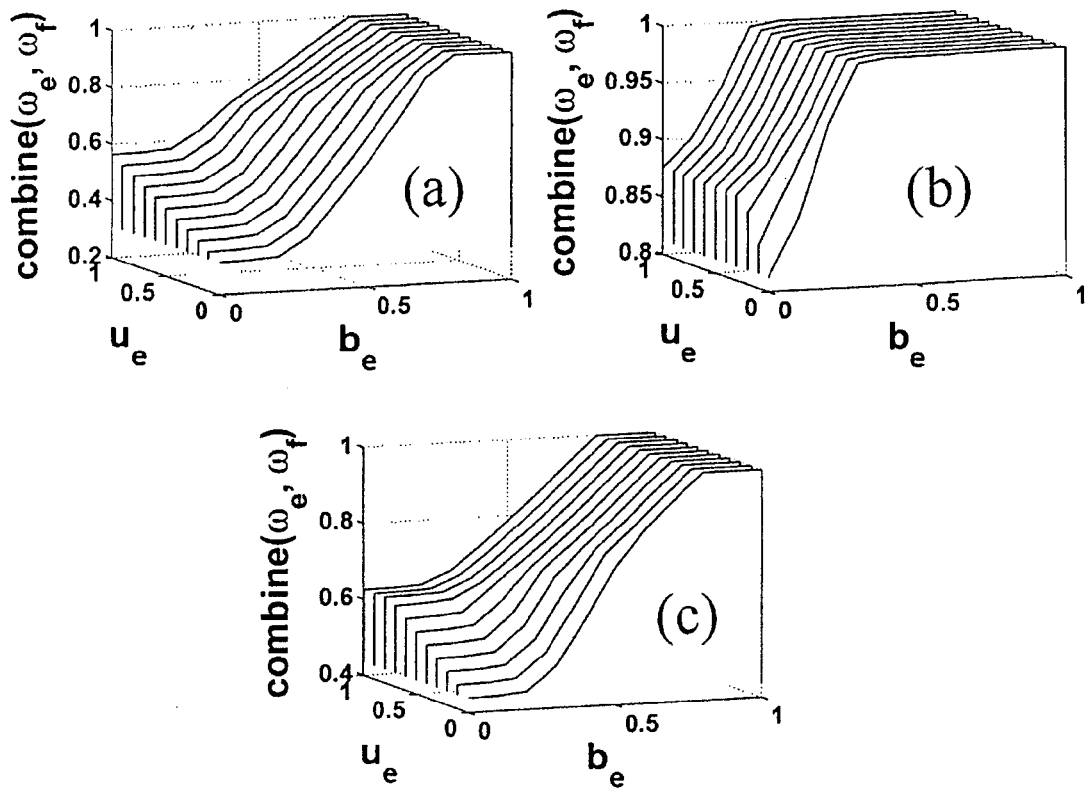
FIG. 3C shows an exemplary evolution of two opinions $\omega_e$ and $\omega_f$ on sensor data, equally weighted.
Figure 3B:
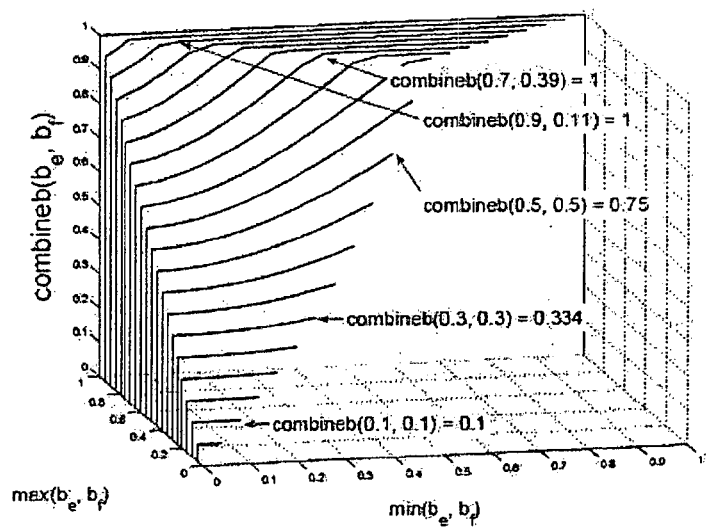
FIG. 3B shows an exemplary evolution of a combineb operator for five values of the maximum between two beliefs $b_e$ and $b_f$ on sensor data.

With reference to FIGS. 3A to 3C, an exemplary implementation of the trust evaluation at each step of data processing within a sensor data life-cycle in accordance with FIG. 1 using subjective logic is shown. In other words, the previously described trust model is implemented mapping trust evaluation or trust assessment to subjective logic opinions. The trust model specifies trust (or trustworthiness) assessment (or evaluation) of sensor data during sensor data acquisition 210, sensor data delivery 240, sensor data aggregation 232, and sensor data fusion 234.

Subjective logic may include or refer to a logic-based framework based on Dempster-Schafer theory of evidence. More generally, (propositional) logics, probabilistic logics, logics of belief, subjective logic, or similar terminology, may include or refer to formalisms used to describe the truth values (i.e. true and false) of propositions in a computer system. A proposition may be any event and/or data occurring in a computer system such as whether a sensor node has received the event that a measured pulse is 90; i.e. "pulse is 90" is a proposition. Probabilistic logics (or probability logics) may aim at combining the capacity of probability theory to handle uncertainty within the capacity of deductive logic. Probabilistic logics may make traditional (propositional) logics truth tables redundant because the results they define are derived through probabilistic expressions instead. In particular, probabilistic logics may assign to each logical proposition a probabilistic truth value in the closed real interval between 0 and 1, i.e. [0,1] which can be computed by means of statistical or probabilistic analysis about the proposition (e.g. "pulse 90"=0.745 denotes a probability of 0.745 that the sensor data "pulse 90" acquired from a sensor node is true). Subjective logic may be a type of probabilistic logic that explicitly takes uncertainty and belief ownership into account in order to represent, model or analyze aspects in a computer system involving uncertainty and incomplete knowledge.

Arguments in subjective logics may be opinions about proposition (e.g. an opinion about the truth of the sensor data "pulse 90" acquired from a sensor node in a WSN and or an opinion about the trustworthiness of the sensor node itself). Opinions may be expressed by 4-tuples on belief b, disbelief d, uncertainty u and atomicity a, each of the values being in the interval [0,1] of real numbers, wherein b+d+u=1. An implementation of a logic in a computer system may be realized by a set of inference rules according to the characteristics of the logic to be implemented which may be considered as a function from sets of logical formulae to formulae. Implementing a logic by a set of inference rules, a computer system may automatically reason (i.e. automatically derive or compute conclusions) about propositions made in the system in terms of inference rules.

In general, in subjective logic, opinions $\omega$ about propositions P are expressed and manipulated. An opinion $\omega$ is represented by a 4-tuple (b, d, u, a), wherein a represents a base rate or atomicity, i.e. the a priori probability in the absence of evidence. The values b, d, and u represent the belief that a specific proposition is true, the belief that the specific proposition is false (i.e. the disbelief that the specific proposition is true), and the uncertainty is the amount of uncommitted belief (i.e. the amount of belief that is not committed to the truth and falsehood of the specific proposition), respectively. The range of these four values b, d, u, and a is the closed interval between 0 and 1, denoted [0,1], i.e. any real number between 0 and 1 excluding 0 and 1 themselves, wherein b+d+u=1 holds. The opinion of an entity e about a proposition P is defined as $\omega_P^e$=b+a.u. The framework of subjective logic provides a set of logical operators for combining (integrating, subsuming, joining, or relating) opinions $\omega$ such as conjunction, disjunction and negation in addition to non-traditional operators for consensus or discount of opinions. Subjective logic may be implemented in a computer by a set of corresponding inference rules which allow for automatic reasoning on opinions $\omega$ about propositions P.

Applying subjective logic and the notion of opinion to trust evaluation of sensor data 111 during sensor data processing in a sensor data life-cycle consist in determining an opinion $\omega$ in the following proposition: "a sensor data is trustworthy enough to be used". Additionally, subjective logic allows for representing uncertainty with respect to sensor data measurement (e.g. quality of service, accuracy of a sensor node). Therefore, the framework of subjective logic is appropriate or suitable to represent for measuring uncertainty with respect to sensor data 111. Furthermore, sensor data processing benefits from subjective logic operators for combining (integrating, subsuming, joining, or relating) opinions $\omega$ on collected or acquired sensor data 111.

In one exemplary implementation of the trust model for trust evaluation of sensor data at each step of sensor data processing atomicity a is set to ½ since only binary state spaces for propositions P are considered.

Based on the above introduced trust model for trust evaluation of sensor data during a sensor data life-cycle (as defined in definitions 6 to 9) and capitalizing on subjective logic, trust evaluation of a sensor data attribute a 112 by an entity e (i.e. $\phi(P_a,e)$) such as a sensor node 101, 102, 103, 104, 110, 120 is defined as $\omega_a^e$ in one implementation. In other words, a trust value an entity e has in a sensor data attribute a 112 is computed by determining an opinion $\omega_a^e$, the entity e has in the trustworthiness of the attribute a 112. Similarly, trust evaluation of an entity f by an entity e (i.e. $\phi(P_f,e)$) is defined as $\omega_f^e$. In other words, the expectation probability or value of an entity e in the trustworthiness sensor data attribute a and another entity f, respectively is implemented by determining or evaluating opinions $\omega$ on sensor data attributes a 112 and entities e 110, 200, 310 according to subjective logic.

Such an implementation of a trust model for a sensor data life-cycle using subjective logic may have the advantage that uncertainty with respect to sensor data acquired from sensor nodes can be expressed such as uncertainty in the accuracy of a sensor node. Furthermore, specific operators of subjective logic can be used to combine opinions on sensor data which is aggregated or fused during sensor data processing 230 according to the applied aggregation and/or fusion functions. Hence, also for processed sensor data, uncertainty can be expressed in order to more precisely determine a trust value in the processed and routed sensor data, which is in particular necessary for sensitive data such as physiological data routed and processed in a sensor-based health care monitoring system.

In one implementation, trust values or opinions in sensor data attributes 112 and entities 101-104, 110, 120 200, 310, 320 of a sensor data processing system as shown in FIG. 1 are determined or computed based on a combination of subjective and measurable criteria. Therefore, subjective aspects of sensor data attributes 112 and entities 101-104, 110, 120, 200, 310, 320 (such as a sensor node 101, 102, 103, 104, a sink 110, 120, a middleware 200, or software application 310, 320) reputation are distinguished from measurable aspects such as accuracy and freshness.

In one example, subjective aspects of an opinion are based on past experiences with a given entity 101-104, 110, 120, 200, 310, 320 while measurable aspects are derived from elements or aspects characterizing sensor data attributes 112 and/or entities 101-104, 110, 120, 200, 310, 320. Some subjective and measurable aspects for opinion determination of sensor data attributes 112 and entities 101-104, 110, 120, 200, 310, 320 is shown below in table 1.

TABLE 1

| | Opinion Determination | |
|---|---|---|
| | Subjective | Measurable |
| Attribute | Reputation of Origin | Accuracy |
| | | Type of measurement |
| | Trust | Value |
| Entity | Reputation | Communication protocol |
| | Trust | Entity credentials |

For example, as shown in table 1, on the one hand side reputation of a sensor node 101-104, 110, 120 can be considered as a subjective element or aspect of an origin sensor data attribute 112 of sensor data 111. On the other hand side, credential of an entity 101-104, 110, 120 200, 310, 320 and its used communication protocol are measurable elements or aspects which support the determination of trustworthiness of an entity 101-104, 110, 120 200, 310, 320.

In the definition of an opinion $\omega$ expressed by the 4-tuple (b, d, u, a) which is given below, s denotes a subjective aspect and m denotes a measurable aspect. In one example, the following combination is proposed in order to determine or evaluate an opinion $\omega$ based on those two parameters s and m.

$$\omega = (b, d, u, a) \text{ where } \begin{cases} b = s \cdot m \\ d = s \cdot (1-m) \\ u = 1 - m \end{cases}$$

Accordingly, belief b may be defined as a combination of subjective aspects s and measurable aspects m. Uncertainty u is defined as the opposite of measurable aspects (1−m) and disbelief d is defined as a combination of subjective aspects s and the opposite of measurable aspects (1−m). Based on this combination of subjective aspects s and measurable aspects m, trustworthiness in sensor data attributes 112 and entities 101-104, 110, 120 200, 310, 320 are determined or evaluated.

Based on the above introduced trust model for trust evaluation of sensor data during a sensor data life-cycle and capitalizing on subjective logic, trust evaluation of a sensor data s 111 of an entity e 101-104, 110, 120 200, 310, 320, i.e. $\phi(P_s,e)$ during sensor data acquisition 210 is defined as $\omega_s^e$ in one implementation. An opinion of entity e 111 about sensor data s 101-104, 110, 120, 200, 310, 320 is then computed or evaluated by means of a combine operator. The combine operator computes $\omega_s^e$ based on opinions on the sensor data's s 111 sensor data attributes $a_i$ 112 which are denoted by $\omega_{a_i}^e$.

The combine operator extends the subjective logic framework. The combine operator is introduced to the subjective logic framework in order to implement trust evaluation of sensor data s 111 acquired from one or more sensor nodes 101, 102, 103, 104 as defined in definition 6. In particular, an acquisition trust value (ATV) (i.e. $\phi(P_s,e)$) is computed by means on an operator $\phi_{acqu}$ which aims at combining opinions of a single entity (sensor node) e 101, 102, 103, 104 about different propositions $P_{a_i}$ while leveraging (affecting, effecting, manipulating, or forcing) the influence of most weighted opinions of the sensor node 101, 102, 103, 104 on the sensor data attributes $a_i$ 112. In fact, such functionality is not supported by any of the operators proposed in the subjective logic framework. For example, the consensus operator of the subjective logic framework is not appropriate to evaluate an acquisition trust value (ATV) since this operator rather fuses opinions of different entities about the same proposition than combining opinions of a single entity while taking into consideration influence or impact of most weighted opinions. A mapping of the operator $\phi_{acqu}$ to compute trust of a sensor node e 101, 102, 103, 104 in sensor data s 111 acquired from said sensor node e 101, 102, 103, 104 to the combine operator for computing trustworthiness of acquired sensor data s 111 based on opinions is given in the following:

$$\psi(P_s,e) = \psi_{acquisition}(\psi(P_{a_i},e),\alpha_i)$$

$$\omega_s^e = \text{combine}(\omega_{a_i}^e,\alpha_i)_{i=0}^n$$

$$\omega_s^e = \text{combine}^{\alpha_i}((\omega_{a_i}^e))_{i=0}^n$$

Accordingly, an opinion of an entity e (e.g. a sensor node) 101, 102, 103, 104) on sensor data s 111 is computed by combining opinions of the entity e on sensor data attributes $a_i$ 112 of the sensor data s 111 by considering an influence or impact of a weighing value $\alpha_i$ corresponding to the sensor data attributes $a_i$ 112.

As described above, an opinion ω is specified by a 4-tuple (b, d, u, a) comprising belief b, disbelief d, uncertainty u, and atomicity a. Atomicity a is set to ½ of a given proposition trustworthiness. This 4-tuple is defined for $\omega_s^e$ as follows:

$$\omega_s^e = (b, d, u, a) \text{ where}$$
$$\begin{cases} b = \text{combineb}^{\alpha_i}((b_{a_i}))_{i=0}^n \\ d = 1 - b - u \\ u = \min(1 - b, \text{combineu}^{\alpha_i}((u_{a_i})_{i=0}^n) \end{cases}$$

The operator combineb is applied to each belief value of each attribute $a_i$ of sensor data s while considering corresponding weighting values. Hence, combineb aims at smoothly increasing belief of combined opinions. Uncertainty u is defined by means of an operator combineu applied to each belief value of each attribute $a_i$ of sensor data s while considering corresponding weighting values, wherein the minimum of the opposite of belief and the result of applying the combineu is determined. Hence, uncertainty u is defined in such manner that the influence of uncertainty on combination of opinion is minimized in comparison with belief. Additionally, the constraint b+d+u=1 of subjective logic is considered or respected. This constraint is then used to define disbelief d.

In a first step, the combineb operator is defined for two beliefs. Subsequently, it is extend to more than two beliefs. A combination of two beliefs $b_e$ and $b_f$ consists of a smooth increase of their maximum, depending on the distance $|b_e - b_f|$. This increase is to be exponentially proportional to their maximum belief and to their distance. The combineb operator has then to fulfill the following requirements:

RE1:
$\forall b_e, b_f \in [0, 1]$, $1 \geq \text{combineb}(b_e, b_f) \geq \max(b_e, b_f)$ RE2: $\text{combineb}(b_e,b_f)$ is proportional to the distance $|b_e - b_f|$.

RE3: $\text{combineb}(b_e,b_f)$ is exponentially proportional to max $(b_e,b_f)$.

With requirement RE1, the fact is expressed that the combination of two beliefs always results in an increase. In case of $\min(b_e, b_f)=0$, $\text{combineb}(b_e, b_f)$ is equal to the lower bound, i.e. $\max(b_e, b_f)$. Furthermore, $\text{combineb}(b_e, b_f)$ is up to 1, i.e. its maximal value is 1.

RE2 reflects the fact that the closer the $\min(b_e, b_f)$ is to $\max(b_e, b_f)$, the bigger the combination acceleration has to be. In other words, the combineb operator tends to reward the combination of beliefs which are close to each other.

Finally, RE3 is to reward the combination of high beliefs $b_e$ and $b_f$. Hence, the combination of two beliefs 0.5 and 0.9 is preferred rather than 0.5 and 0.5, even if they are close to each other.

FIG. 3A depicts the fact that a combination of two low beliefs $b_e$ and $b_f$ leads to almost no belief $b_e$ and $b_f$ increases. On the contrary, the combination with two strong beliefs $b_e$ and $b_f$ leads to a quick increase of combined belief $b_e$ and $b_f$. In addition, the combination of two high beliefs $b_e$ and $b_f$ is to be bigger than combination of high and low beliefs.

Based on RE1, RE2 and RE3, the combination between two beliefs $b_e$ and $b_f$ is given below in definition 10:

Definition 10. (Belief Combination)

Let $b_e$ and $b_f$ be agent's beliefs about two distinct propositions a and b. Let $\text{combineb}(b_e, b_f)$ be the belief such that:
$\text{combineb}(b_e,b_f)=\min(1,\max(b_e,b_f)+\epsilon(b_e,b_f))$ where $\epsilon(b_e, b_f)=(b_e \cdot b_f)^{(2-b_e-b_f)}$.

Then, $\text{combineb}(b_e, b_f)$ is called the combination of beliefs $b_e$ and $b_f$ representing an entity's 101-104, 110, 120, 200, 310, 320 belief about the combination of propositions a and b being true.

FIG. 3B shows an exemplary evolution of $\text{combineb}(b_e, b_f)$ for five values of the maximum between beliefs $b_e$ and $b_f$. This evolution of $\text{combineb}(b_e, b_f)$ corresponds to the three requirements RE1 to RE3 as introduced above. When the maximum between the beliefs $b_e$ and $b_f$ equals to 0.1, the increase of $\text{combineb}(b_e, b_f)$ is smaller than the one with the maximum equals to 0.9 (RE1 and RE3). Moreover combineb $(b_e, b_f)$ increases progressively while the distance between the two beliefs $b_e$ and $b_f |b_e-b_f|$ tends to zero (RE2).

As far combination of more than two beliefs is considered, a combination of beliefs is defined as follows:

$$combineb(b_{a_i})_{i=0}^n = \begin{cases} \text{for } n=0, & \omega_{a_0} \\ \text{for } n=1, & combineb(b_{a_0}, b_{a_1}) \\ \text{otherwise}, & combineb(b_{a_n}^e, combineb(b_{a_i}^e)_{i=0}^{n-1}) \end{cases}$$

With respect to uncertainty combination, combined uncertainty is reduced or lowered by computing an average of uncertainty as follows:

$$combineu^{\alpha_i}(u_{a_i})_{i=0}^n = \frac{\sum_{i=0}^n (u_{a_i} \cdot \alpha_i)}{\sum_{i=0}^n (\alpha_i)}$$

FIG. 3C shows an evolution of a combination of two opinions, $\omega_e$ and $\omega_f$, equally weighted. Three fixed values of belief and uncertainty of $\omega_f$ are set. For curve (a), (b) and (c), $\omega_f$ is set to 0.375 ($b_f$=0.25 and $u_f$=0.25), 0.875 ($b_f$=0.75 and $u_f$=0.25) and 0.625 ($b_f$=0.25 and $u_f$=0.75), respectively. With (a), (b) and (c), it is shown that combination of opinions smoothly increase up to 1. With (a) and (c), the impact of high uncertainty of combination of opinions is shown. Additionally, comparing (a) and (b), combined belief in comparison to uncertainty is leveraged.

Based on the above introduced trust model for trust evaluation of sensor data during a sensor data life-cycle and capitalizing on subjective logic, trust evaluation of an entity f 101-104, 110, 120, 200, 310, 320 of an entity e 101-104, 110, 120, 200, 310, 320, i.e. $\phi(P_{s,f\rightarrow e}, e)$ during sensor data delivery 240 is defined as $\omega_{s,f\rightarrow e}^e$ in one implementation. The opinion or trust value $\omega_{s,f\rightarrow e}^e$ is then computed or evaluated by means of the discount operator of subjective logic as follows:

$$\psi(P_{s,f\rightarrow e},e) = \psi_{delivery}(\psi(P_{s,f}),\psi(P_f,e))$$

$$\omega_{s,f\rightarrow e}^e = discount(\omega_s^f, \omega_f^e)$$

The discount operator perfectly fits, by definition, to compute $\omega_{s,f\rightarrow e}^e$ based on $\omega_s^f$ and $\omega_f^e$. Dedicated to transitive trust computation, the discount operator enables any entity e 101-104, 110, 120, 200, 310, 320 to form an opinion on a proposition $P_s$ by discounting opinion $\omega_s^f$ and $\omega_f^e$.

In order to determine trustworthiness of sensor data fusion 234, the combine operator is used in one implementation. As previously defined, the combine operator combines opinions of an entity e 101-104, 110, 120, 200, 310, 320 in a single opinion. In the case of fusion of data, opinions of a single entity e 101-104, 110, 120, 200, 310, 320 is combined on different propositions used to infer on a single proposition.

$$\psi(P\otimes_{(s_i)_{i=0}^n},e) = \psi\otimes(\psi(P_{s_i},e),\alpha_i)_{i=0}^n$$

$$\omega\otimes_{(s_i)_{i=0}^n}^e = combine(\omega_{s_i}^e,\alpha_i)_{i=0}^n$$

$$\omega\otimes_{(s_i)_{i=0}^n}^e = combine^{\alpha_i}(\omega_{s_i}^e)_{i=0}^n$$

In one implementation, an average on opinion on sensor data 111 of sensor data aggregation 232 is computed. This average computation has to involve weight of aggregated sensor data, as expressed in the following definition of the average operator.

$$\psi(P_{\oplus(s_i)_{i=0}^n},e) = \psi_\oplus(\psi(P_{s_i}e),\alpha_i)_{i=0}^n$$

$$\omega_{\oplus(s_i)_{i=0}^n}^e = average(\omega_{s_i}^e,\alpha_i)_{i=0}^n$$

The average operator is defined as follows:

$$average(\omega_{s_i}^e,\alpha_i)_{i=0}^n \begin{cases} b_{average} = \dfrac{\sum_{i=0}^n (b_{p_{s_i}} \cdot \alpha_i)}{\sum_{i=0}^n (\alpha_i)} \\ d_{average} = \dfrac{\sum_{i=0}^n (d_{p_{s_i}} \cdot \alpha_i)}{\sum_{i=0}^n (\alpha_i)} \\ u_{average} = \dfrac{\sum_{i=0}^n (u_{p_{s_i}} \cdot \alpha_i)}{\sum_{i=0}^n (\alpha_i)} \end{cases}$$

In summary, a trust model for trust evaluation in each step 210, 230, 240 of a sensor data life-cycle as shown in FIG. 1 is implemented by means of subjective logic. The notion of opinion is then used to assess the trustworthiness of sensor data 111. Including belief and uncertainty on the proposition that "the sensor data s is trustworthy enough to be used", the subjective logic framework supports the combination of opinions with several operators (e.g. discount, consensus). In order to determine the opinion of a single entity e 101-104, 110, 120, 200, 310, 320 about different interdependent propositions, the combine operator is introduced by extending the subjective logic framework. The latter is used to determine opinions of sensor data acquisition 210 and sensor data fusion 234. Furthermore, the average operator defined by subjective logic is adapted in order to consider weight of opinions. Finally, the discount operator for sensor data delivery 240 is re-used.

Figure 5:
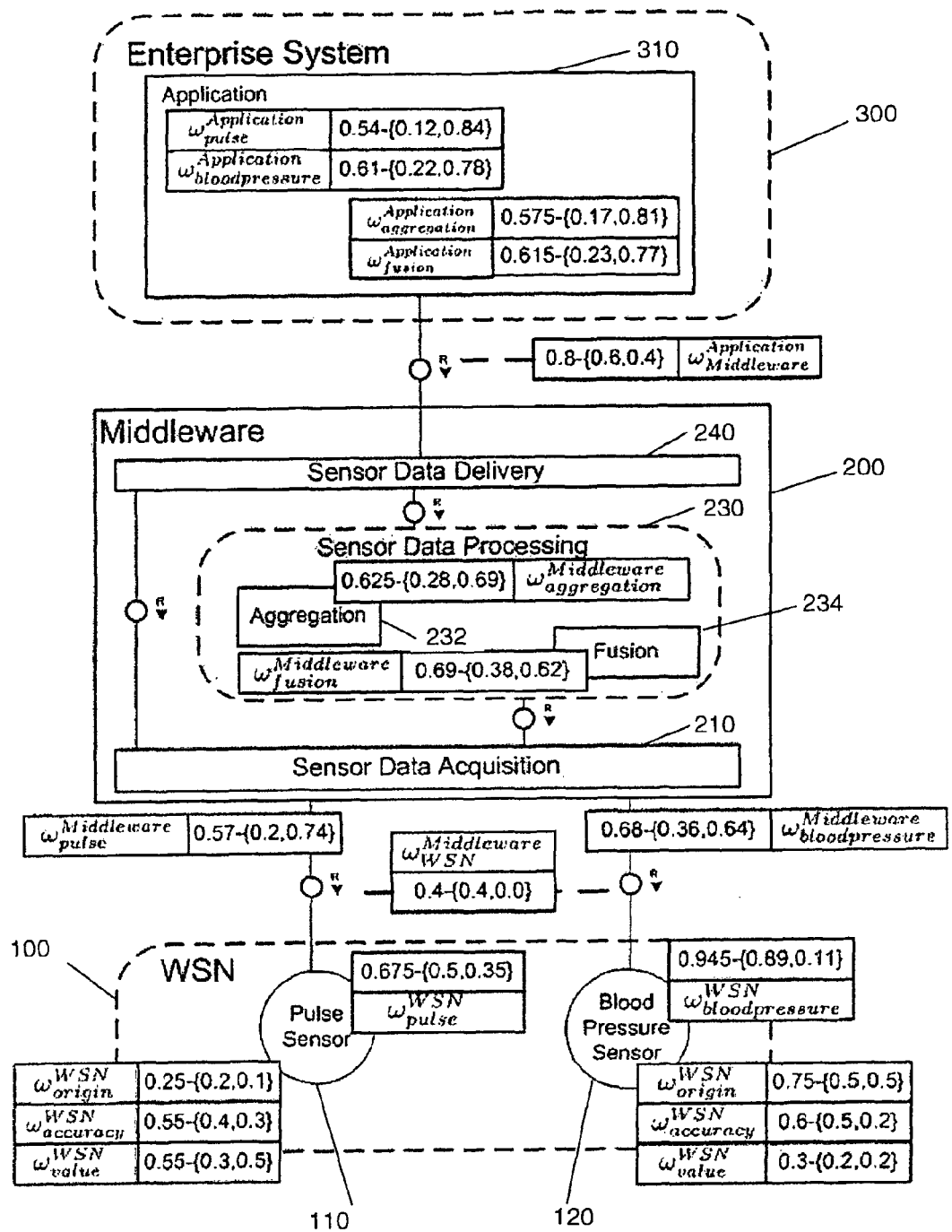
FIG. 5 shows a block diagram of an exemplary life-cycle of sensor data in a health-care monitoring system with trustworthiness assessment in sensor data and processing.

FIG. 5 shows an exemplary remote health care monitoring system illustrating an exemplary implementation of the above introduced trust model implemented using subjective logic opinions. In the system of FIG. 5, patient activities such as a patient's hydration or awakening schedule and/or physiological data relating to patients (e.g. blood pressure, pulse, body temperature) are monitored 24 hours a day via a (wireless) body sensor network (BSN) 100.

The BSN 100 may be a combination of any kind of wearable and/or implemental sensor devices and exemplary comprises a pulse sensor node 110 and a blood pressure sensor node 120, both having functionality of a sink.

The BSN 100 is connected to a Medical Emergency Response Center (MERC) 300 comprising appropriate response software 310 through a patient's PDA 200. The PDA 200 is in charge of detecting any kinds of irregularities in the patient's health condition and of aggregating physiological patient information. In one example, the PDA 200 can trigger an alert in case of emergency to the MERC software 310 that, in turn, contacts a physician close to the patient's home. Furthermore, the physician may also request for aggregation of physiological information for a better diagnostic.

Figure 4:
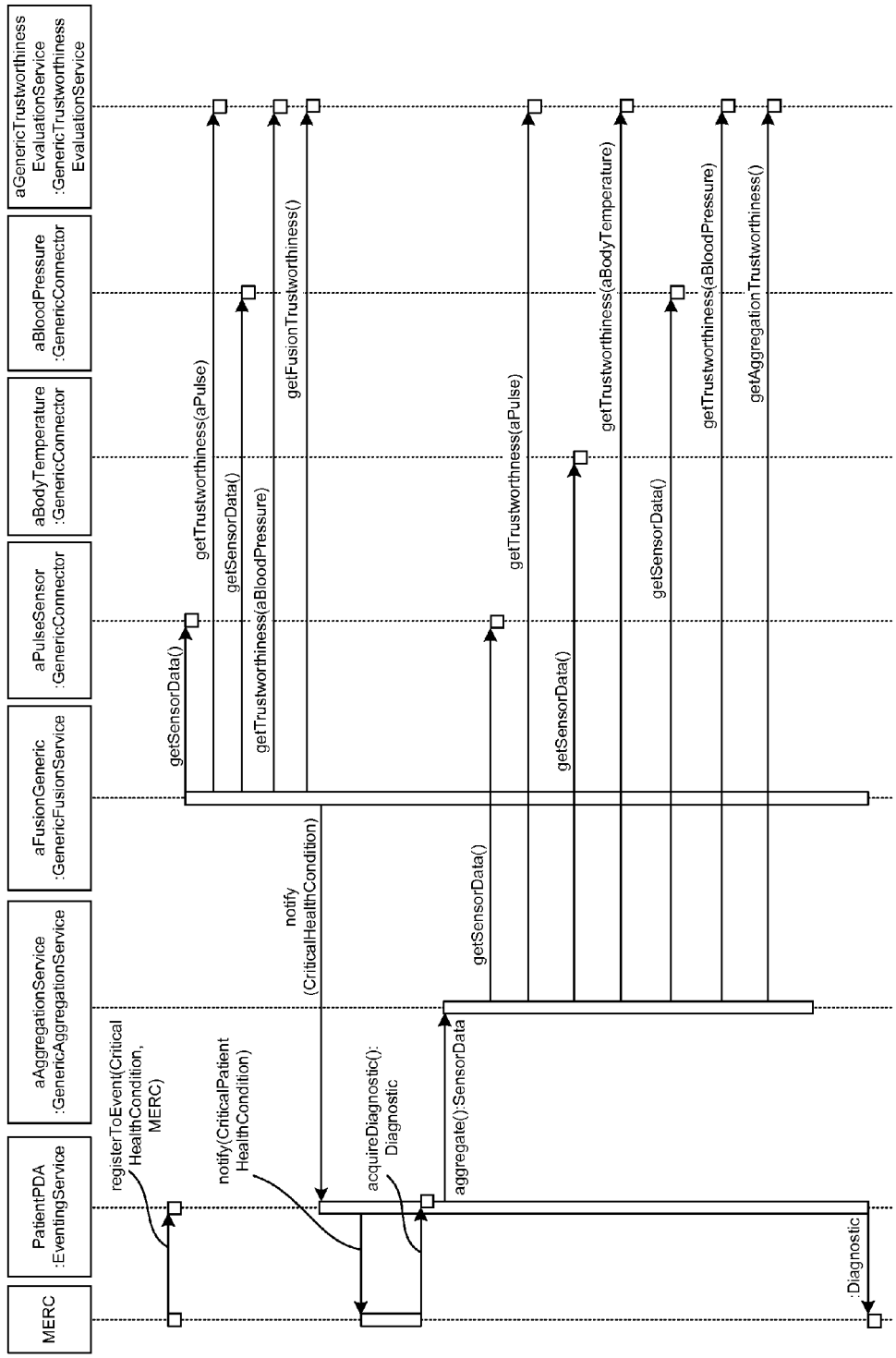
FIG. 4 shows a flow diagram of an exemplary trustworthiness assessment of physiological data acquired from sensor nodes in a remote health-care monitoring system.

FIG. 4 shows a flow diagram of exemplary trust evaluation at acquisition, aggregation, and fusion of physiological sensor data from the BSN 100 via the PDA 200 to the MERC software 310.

In this context, FIG. 5 shows exemplary trust evaluation of pulse and blood pressure from sensor nodes 110 and 120 to a MERC software application 310. Applying the corresponding trust operators for computing acquisition trust values, delivery trust values, aggregation trust values, and fusion trust values incorporating the notion of opinion and weight as introduced above with reference to FIGS. 1 to 3, confidence or trust evaluation in sensor data and their processing is shown.

In FIG. 5, opinions are noted by pe—{b, d, u}, wherein pe denotes an expectation probability a corresponding entity 110, 120, 200, 310 has in the trustworthiness of corresponding sensor data and/or their processing, b belief, d, disbelief, and u uncertainty as defined above. In one exemplary implementation as shown in FIG. 5, each sensor data attribute or sensor data being output of fusion an aggregation is equally weighted.

An implementation of trust evaluation using the mechanisms introduced above with reference to FIGS. 1 to 3 homogenizes trust evaluation of sensor data with their life cycle. As shown in FIG. 5, the same metric is from sensor data acquisition via sensor data processing to sensor data delivery. Furthermore, each sensor data attribute of sensor data comprised in a life-cycle is considered when evaluating trust.

Figure 6:
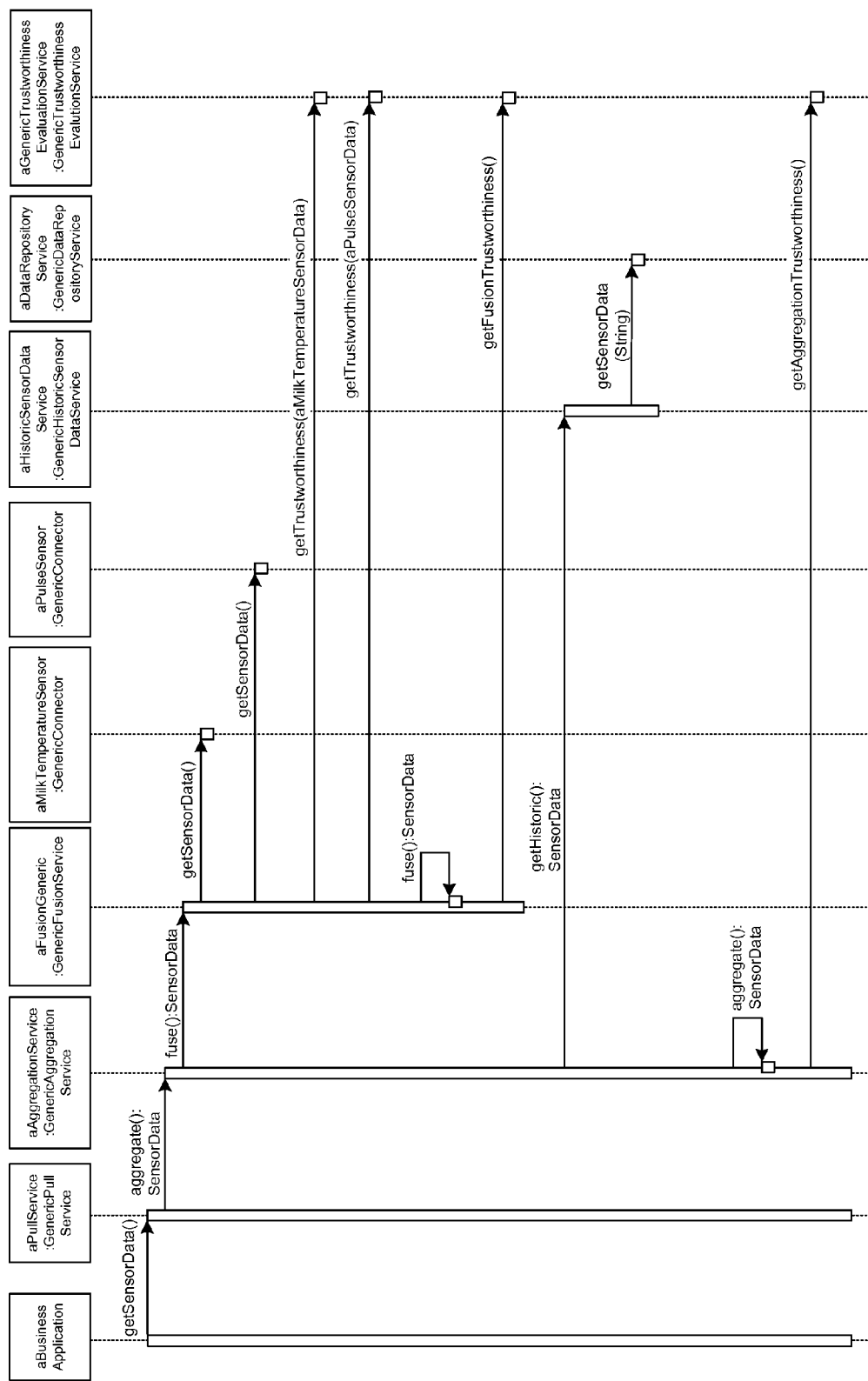
FIG. 6 shows a flow diagram of an exemplary trustworthiness assessment of physiological data in a remote claw health monitoring system.

FIG. 6 shows an exemplary trust evaluation using the mechanisms as introduced with reference to FIGS. 1 to 3 in a system for monitoring and detecting any diseases in a herd of a farmer. Based on information or data such as milk temperature, body temperature or pulse history retrieved from one or more sensors. Similar to the remote health care system shown in FIGS. 4 and 5, trustworthiness is assessed of physiological data, aggregation, and7or fusion of said data.

In this use case, farmers aims at monitoring and detecting any diseases in his herd. Based on information such as milk temperature, body temperature or pulse history, the farmer or veterinarian can infer on health condition of the herd. Similar to the remote health care monitoring introduced in section 6.1, we then assess trustworthiness of physiological information, aggregation or fusion of information.

Figure 7:
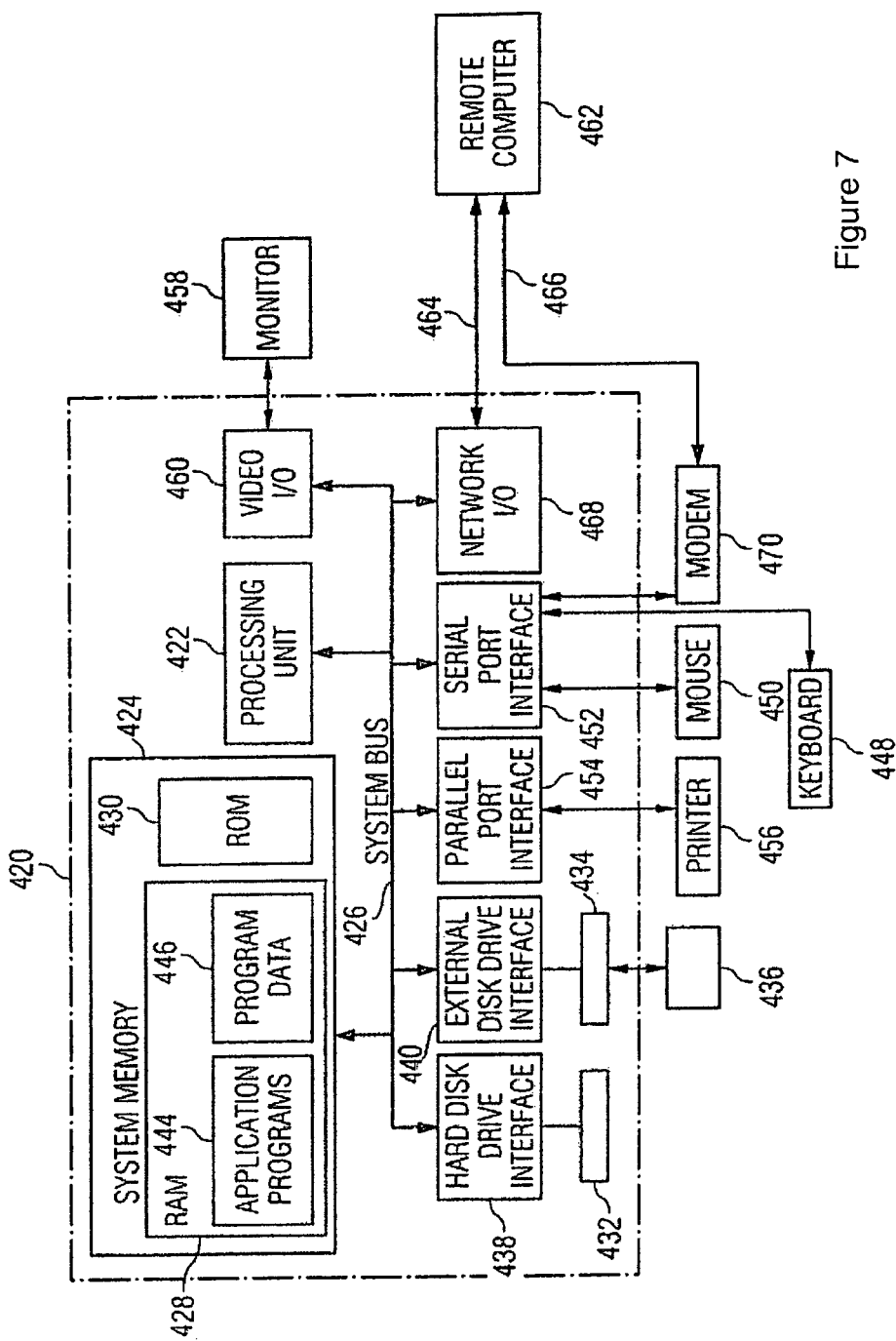
FIG. 7 shows a block diagram of an exemplary computer (network) system.

With reference to FIG. 7, an exemplary system for implementing the invention includes a general purpose computing device in the form of a conventional computing environment 420 (e.g. personal computer), including a processing unit 422, a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk may be a magnetic disk for a magnetic disk driver or an optical disk such as a CD ROM for an optical disk drive. The hard disk drive 432 and external disk drive 434 are connected to the system bus 426 by a hard disk drive interface 438 and an external disk drive interface 440, respectively. The drives and their associated computer-readable media provide nonvolatile storage of computer readable instructions, data structures, program modules and other data for the personal computer 420. The data structures may include relevant data of the implementation of the method for trustworthiness assessment of sensor data processing during a sensor data life-cycle, as described in more details below. The relevant data may be organized in a database, for example a relational or object database.

Although the exemplary environment described herein employs a hard disk (not shown) and an external (removable) disk 436, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external (removable) disk 436, ROM 430 or RAM 428, including an operating system (not shown), one or more application programs 444, other program modules (not shown), and program data 446. The application programs may include at least a part of the functionality as detailed in FIGS. 1 to 6.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456, and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 20 may operate in a networked environment using connections to one or more electronic devices. FIG. 7 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 7 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the insurance claim management evaluation method (described in more detail further below) may be resident on or accessible via the remote computer 462. The data may be stored for example in an object or a relation database. It will be appreciated that the network connections shown are exemplary and other means of establishing a communications link between the electronic devices may be used.

The above-described computing system is only one example of the type of computing system that may be used to implement the method for trustworthiness assessment of sensor data processing during a sensor data life-cycle.

What is claimed is:

1. A computer-implemented method for trust evaluation of sensor data during at least part of a sensor data life-cycle, performed by at least one processor, the method comprising:
    evaluating, by the at least one processor, an acquisition trust value (ATV) of sensor data having one or more sensor data attributes at a sensor data acquisition module from at least one sensor node in a wireless sensor network (WSN) based on a trust value for each of the one or more sensor data attributes, the WSN including at least one sink, the evaluation of the ATV including determining an expectation probability of the at least one sensor node that the sensor data is trustworthy;
    evaluating, by the at least one processor, a delivery trust value (DTV) of the sensor data at a sensor data delivery module from a sending entity to a receiving entity, the evaluation of the DTV including determining an expectation probability of the sending entity in the trustworthiness of the sensor data and determining an expectation probability of the receiving entity in the trustworthiness of the sending entity;
    evaluating, by the at least one processor, a processing trust value (PTV) at a sensor data processing module in a processing entity, the evaluation of the PTV including determining an expectation probability of the processing entity that the sensor data is trustworthy, the sensor data processing module performing at least one of data aggregation processing and data fusion processing,
    wherein each of the ATV, the DTV, and the PTV is a truth value within a range of truth values between a first value and a second value, truth values proximate to the first value being less trustworthy than truth values proximate to the second value; and
    determining, by the at least one processor, a trust model for the trust evaluation of the sensor data based on the ATV, the DTV, and the PTV, the trust model representing a trustworthiness of the sensor data in a sensor data life-cycle.

2. The computer-implemented method according to claim 1, wherein evaluating a processing trust value (PTV) comprises:
    evaluating at least one of an aggregation trust value (AgTV) for the data aggregation processing and a fusion trust value (FTV) for the data fusion processing, in the processing entity.

3. The computer-implemented method according to claim 1, wherein the processing entity includes the at least one sensor node or a middleware.

4. The computer-implemented method according to claim 1, wherein
    the sending entity includes the at least one sensor node and the receiving entity includes the at least one sink; or
    the sending entity includes the at least one sink and the receiving entity includes a middleware; or
    the sending entity includes the middleware and the receiving entity includes at least one software application.

5. The computer-implemented method according to claim 1, wherein evaluating an acquisition trust value (ATV) comprises:
    determining the trust value for each of the one or more sensor data attributes of the sensor data acquired from the at least one sensor node; and
    evaluating the ATV of the sensor data using an operator depending on the trust value for each of the one or more sensor data attributes and a corresponding weighting value.

6. The computer-implemented method according to claim 1, wherein evaluating a delivery trust value (DTV) comprises:
    determining the ATV of the sending entity in the sensor data;
    determining a secondary trust value of the receiving entity in the sending entity; and
    evaluating the DTV using an operator depending on the ATV and the secondary trust value.

7. The computer-implemented method according to claim 2, wherein evaluating an aggregation trust value (AgTV) for the data aggregation processing comprises:
    determining at least one trust value of at least one portion of sensor data; and
    evaluating the AgTV for sensor data aggregated from the at least one portion of sensor data using an operator depending on the at least one trust value and at least one corresponding weighting value.

8. The computer-implemented method according to claim 2, wherein evaluating a fusion trust value (FTV) for the data fusion processing comprises:
    determining at least one trust value of at least one portion of sensor data; and
    evaluating the FTV for sensor data fused from the at least one portion of sensor data using an operator depending on the at least one trust value and at least one corresponding weighting value.

9. The computer-implemented method according to claim 5, further comprising:
    determining the trust value including computing at least one opinion value on the one or more sensor data attributes; and
    implementing the operator using a combine operator combining the at least one opinion value according to the corresponding weighting value.

10. The computer-implemented method according to claim 6, further comprising:
    determining the ATV including computing a first opinion value;
    determining the secondary trust value including computing a second opinion value; and
    implementing the operator using a discount operator applied to the first and second opinion values.

11. The computer-implemented method according to claim 7, further comprising:
    determining the at least one trust value including computing at least one opinion value on the at least one portion of sensor data; and
    implementing the operator using an average operator computing an average of the at least one opinion value according to the at least one corresponding weighting value.

12. The computer-implemented method according to claim 8, further comprising:
    determining at least one trust value including computing at least one opinion value on the at least one portion of sensor data; and implementing the operator using a combine operator combining the at least one opinion value according to the at least one corresponding weighting value.

13. The computer-implemented method according to claim 9, wherein implementing the combine operator comprises:
   implementing a combineb operator to compute belief including combining at least one belief value of the one or more sensor data attributes of the sensor data according to the corresponding weighting value; and
   implementing a combineu operator to compute uncertainty including combining at least one uncertainty value of the one or more sensor data attributes of the sensor data according to the corresponding weighting value, wherein an influence of the uncertainty is minimized in comparison with the belief.

14. The computer-implemented method of claim 1, wherein the sensor data life-cycle includes process steps from acquisition of the sensor data from the at least one sensor node to delivery of the sensor data to at least one software application through a middleware.

15. A computer program product including a non-transitory computer-readable medium storing instructions that when executed cause at least one processor to obtain a trust evaluation of sensor data, the instructions comprising instructions to:
   evaluate an acquisition trust value (ATV) of sensor data having one or more sensor data attributes at a sensor data acquisition module from at least one sensor node in a wireless sensor network (WSN) based on a trust value for each of the one or more sensor data attributes, the WSN including at least one sink, the evaluation of the ATV including determining an expectation probability of the at least one sensor node that the sensor data is trustworthy;
   evaluate a delivery trust value (DTV) of the sensor data at a sensor data delivery module from a sending entity to a receiving entity, the evaluation of the DTV including determining an expectation probability of the sending entity in the trustworthiness of the sensor data and determining an expectation probability of the receiving entity in the trustworthiness of the sending entity;
   evaluate a processing trust value (PTV) at a sensor data processing module in a processing entity, the evaluation of the PTV including determining an expectation probability of the processing entity that the sensor data is trustworthy, the sensor data processing module performing at least one of data aggregation processing and data fusion processing,
   wherein each of the ATV, the DTV, and the PTV is a truth value within a range of truth values between a first value and a second value, truth values proximate to the first value being less trustworthy than truth values proximate to the second value; and
   determine a trust model for the trust evaluation of the sensor data based on the ATV, the DTV, and the PTV, the trust model representing a trustworthiness of the sensor data in a sensor data life-cycle.

16. The computer program product of claim 15 wherein the instructions include instructions to:
   evaluate at least one of an aggregation trust value (AgTV) for the data aggregation processing and a fusion trust value (FTV) for the data fusion processing, in the processing entity.

17. The computer program product of claim 15 wherein the processing entity includes the at least one sensor node or a middleware.

18. The computer program product of claim 15, wherein
   the sending entity includes the at least one sensor node and the receiving entity includes the at least one sink; or
   the sending entity includes the at least one sink and the receiving entity includes a middleware; or
   the sending entity includes the middleware and the receiving entity includes at least one software application.

19. The computer program product of claim 15, wherein the instructions to evaluate the acquisition trust value (ATV) includes:
   determining the trust value for each of the one or more sensor data attributes of the sensor data acquired from the at least one sensor node; and
   evaluating the ATV of the sensor data using an operator depending on the trust value for each of the one or more sensor data attributes and a corresponding weighting value.

20. The computer program product of claim 15, wherein the instructions to evaluate a delivery trust value (DTV) includes:
   determining the ATV of the sending entity in the sensor data;
   determining a secondary trust value of the receiving entity in the sending entity; and
   evaluating the DTV using an operator depending on the ATV and the secondary trust value.

21. The computer program product of claim 16, wherein the instructions to evaluate the aggregation trust value (AgTV) for the data aggregation processing includes:
   determining at least one trust value of at least one portion of sensor data; and
   evaluating the AgTV for sensor data aggregated from the at least one portion of sensor data using an operator depending on the at least one trust value and at least one corresponding weighting value.

22. The computer program product of claim 16, wherein the instructions to evaluate the fusion trust value (FTV) for the data fusion processing includes:
   determining at least one trust value of at least one portion of sensor data; and
   evaluating the FTV for sensor data fused from the at least one portion of sensor data using an operator depending on the at least one trust value and at least one corresponding weighting value.

23. A computer system for trust evaluation of sensor data during at least part of a sensor data life-cycle, the system comprising:
   at least one processor;
   a non-transitory computer-readable storage medium including instructions executable by the at least one processor, the instructions configured to implement,
   a sensor data acquisition tool operable to evaluate an acquisition trust value (ATV) of sensor data having one or more sensor data attributes at sensor data acquisition from at least one sensor node in a wireless sensor network (WSN) based on a trust value for each of the one or more sensor data attributes, the WSN including at least one sink, the evaluation of the ATV including determining an expectation probability of the at least one sensor node that the sensor data is trustworthy;
   a sensor data delivery tool operable to evaluate a delivery trust value (DTV) of the sensor data at sensor data delivery from a sending entity to a receiving entity, the evaluation of the DTV including determining an expectation probability of the sending entity in the trustworthiness of the sensor data and determining an expectation probability of the receiving entity in the trustworthiness of the sending entity;

a sensor data processing tool operable to evaluate a processing trust value (PTV) at sensor data processing in a processing entity, the evaluation of the PTV including determining an expectation probability of the processing entity that the sensor data is trustworthy, the sensor data processing module performing at least one of data aggregation processing and data fusion processing, wherein each of the ATV, the DTV, and the PTV is a truth value within a range of truth values between a first value and a second value, truth values proximate to the first value being less trustworthy than truth values proximate to the second value; and a trust modeling tool operable to determine a trust model for the trust evaluation of the sensor data based on the ATV, the DTV, and the PTV, the trust model representing a trustworthiness of the sensor data in a sensor data life-cycle.

24. The computer system according to claim 23, wherein the sensor data processing tool is further operable to:
evaluate at least one of an aggregation trust value (AgTV) for the data aggregation processing and a fusion trust value (FTV) for the data fusion processing, in the processing entity.

25. The computer system according to claim 23, wherein the processing entity includes the at least one sensor node or a middleware.

26. The computer system according to claim 23, wherein
the sending entity includes the at least one sensor node and the receiving entity includes the at least one sink; or
the sending entity includes the at least one sink and the receiving entity includes a middleware; or
the sending entity includes the middleware and the receiving entity includes at least one software application.

27. The computer system according to claim 23, wherein the sensor data acquisition tool is further operable to:
determine the trust value for each of the one or more sensor data attributes of the sensor data acquired from the at least one sensor node; and
evaluate the ATV of the sensor data using an operator depending on the trust value for each of the one or more sensor data attributes and a corresponding weighting value.

28. The computer system according to claim 23, wherein the sensor data delivery tool is further operable to:
determine the ATV of the sending entity in the sensor data;
determine a secondary trust value of the receiving entity in the sending entity; and
evaluate the DTV using an operator depending on the ATV and the secondary trust value.

* * * * *